United States Patent
Springborn et al.

(10) Patent No.: US 8,095,472 B2
(45) Date of Patent: Jan. 10, 2012

(54) BUSINESS OBJECT ACTING AS A LOGICALLY CENTRAL SOURCE FOR COLLABORATION ON OBJECTIVES

(75) Inventors: Steffen Springborn, Edingen (DE); Jens Griessmann, Walldorf (DE); Arno Mielke, Karlsruhe (DE); Klaus Herter, Leimen (DE)

(73) Assignee: SAP AG, Walldorf (DE)

( * ) Notice: Subject to any disclaimer, the term of this patent is extended or adjusted under 35 U.S.C. 154(b) by 1176 days.

(21) Appl. No.: 11/841,545

(22) Filed: Aug. 20, 2007

(65) Prior Publication Data

US 2009/0055796 A1 Feb. 26, 2009

(51) Int. Cl.
*G06Q 10/00* (2006.01)
*G06F 9/44* (2006.01)

(52) U.S. Cl. .......................... 705/301; 705/348; 717/102
(58) Field of Classification Search .......................... None
See application file for complete search history.

(56) References Cited

U.S. PATENT DOCUMENTS

| | | | | |
|---|---|---|---|---|
| 2002/0065696 A1* | 5/2002 | Hack et al. | | 705/7 |
| 2004/0006585 A1* | 1/2004 | Paulus et al. | | 709/200 |
| 2005/0021348 A1* | 1/2005 | Chan et al. | | 705/1 |
| 2005/0071369 A1 | 3/2005 | Lang et al. | | |
| 2005/0256798 A1 | 11/2005 | Herter et al. | | |
| 2005/0257197 A1 | 11/2005 | Herter et al. | | |
| 2006/0064671 A1 | 3/2006 | Herter et al. | | |
| 2006/0136873 A1 | 6/2006 | Herter et al. | | |
| 2006/0146727 A1 | 7/2006 | Herter et al. | | |
| 2007/0168753 A1 | 7/2007 | Herter et al. | | |
| 2007/0203912 A1* | 8/2007 | Thuve et al. | | 707/10 |
| 2008/0162266 A1* | 7/2008 | Griessmann et al. | | 705/10 |
| 2009/0006147 A1* | 1/2009 | Padmanabhan | | 705/7 |
| 2009/0182609 A1* | 7/2009 | Kelleher | | 705/9 |

* cited by examiner

*Primary Examiner* — Michael J Yigdall
*Assistant Examiner* — Ben Wang
(74) *Attorney, Agent, or Firm* — Fish & Richardson P.C.

(57) ABSTRACT

This disclosure provides various embodiments of a system, method, and software for implementing a logically centralized source for collaboration on objectives. In one aspect, the method identifies one or more requirements and requirement statuses associated with a business entity for use in a business object stored within a logically centralized repository, the repository storing a plurality of business objects, identifies one or more solutions and solution statuses associated with the identified requirements for use in the business object, and notifies a party of an update to one of the statuses associated with the identified requirements and solutions.

20 Claims, 16 Drawing Sheets

US 8,095,472 B2

BUSINESS OBJECT ACTING AS A LOGICALLY CENTRAL SOURCE FOR COLLABORATION ON OBJECTIVES

TECHNICAL FIELD

This disclosure relates to requirement solutions and, more particularly, to systems, methods, and software for implementing a logically centralized source for collaboration on objectives.

BACKGROUND

In general, various industries and businesses have adopted particular requirements and specifications forms with different structures and standards. In some industries, idea management systems and requirement management systems are used to organize the ideas and requirements of businesses. The best known approaches in many industries are the "contract specification" or "product specification" provided by the requesting party and the "requirement specification" or "functional specification" provided by the solution provider. Multiple standards for requirements and specifications currently exist for organizations to select from, for example, the Institute of Electrical and Electronics' Engineering (IEEE) Standards on Requirements, IEEE Std. 830-1998, and Software Requirement Specification (SRS), DIN 69905-VDI/VDE 3694—VDA 6.1. Some organizations elect to develop their own requirement and specification standards for organizational-wide use.

In some industries, the requirements and specifications standards may be similar for business and organizations collaborating on projects. However, in other, more frequent situations, the standards used by the requesting party and those used by the solution provider may be different, in effect creating confusion and conflicts during the sharing of data, instructions, and information within the product development. Additionally, current methods are tied to a single requirement or specification standard, allowing only information in certain formats to be included. In those situations, unique products may create problems for the parties involved through possible data mismatches or the inability to include some requirement or solution parameters based upon an incompatible standard. In other situations, an organization requiring a simple product may be forced into an unduly cumbersome requirement and specification standard, such that the design process becomes unnecessarily difficult to manage.

Product requirements can be dynamic, and it may be difficult for a solution provider to assess whether a current set of requirements is sufficiently stable for the solution process to begin. A solution provided without benefit of the full requirement set is likely to be insufficient. To avoid this, a solution provider may delay the solution process unnecessarily in anticipation of requirements changes.

SUMMARY

This disclosure provides various embodiments of a system and software for implementing a logically centralized source for collaboration on objectives. In one aspect, the method identifies one or more requirements and requirement statuses associated with a business entity for use in a business object stored within a logically centralized repository, the repository storing a plurality of business objects, identifies one or more solutions and solution statuses associated with the identified requirements for use in the business object, and notifies a party of an update to one of the statuses associated with the identified requirements and solutions. In some implementations, the party is the business entity and the updated status is a solution status.

In some implementations, the requirements are nodes within a hierarchically arranged structure and the solutions are nodes with an identically hierarchically arranged structure. A status associated with a node may be dependent on the statuses associated with hierarchically inferior nodes. The two structures may form an overall structure associated with a project status The foregoing example software may also be defined as computer implementable methods. The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3B-1-3B3 are a diagram illustrating an example hierarchical representation of a specific business object in another particular implementation of FIG. 1;

DETAILED DESCRIPTION

Figure 1:
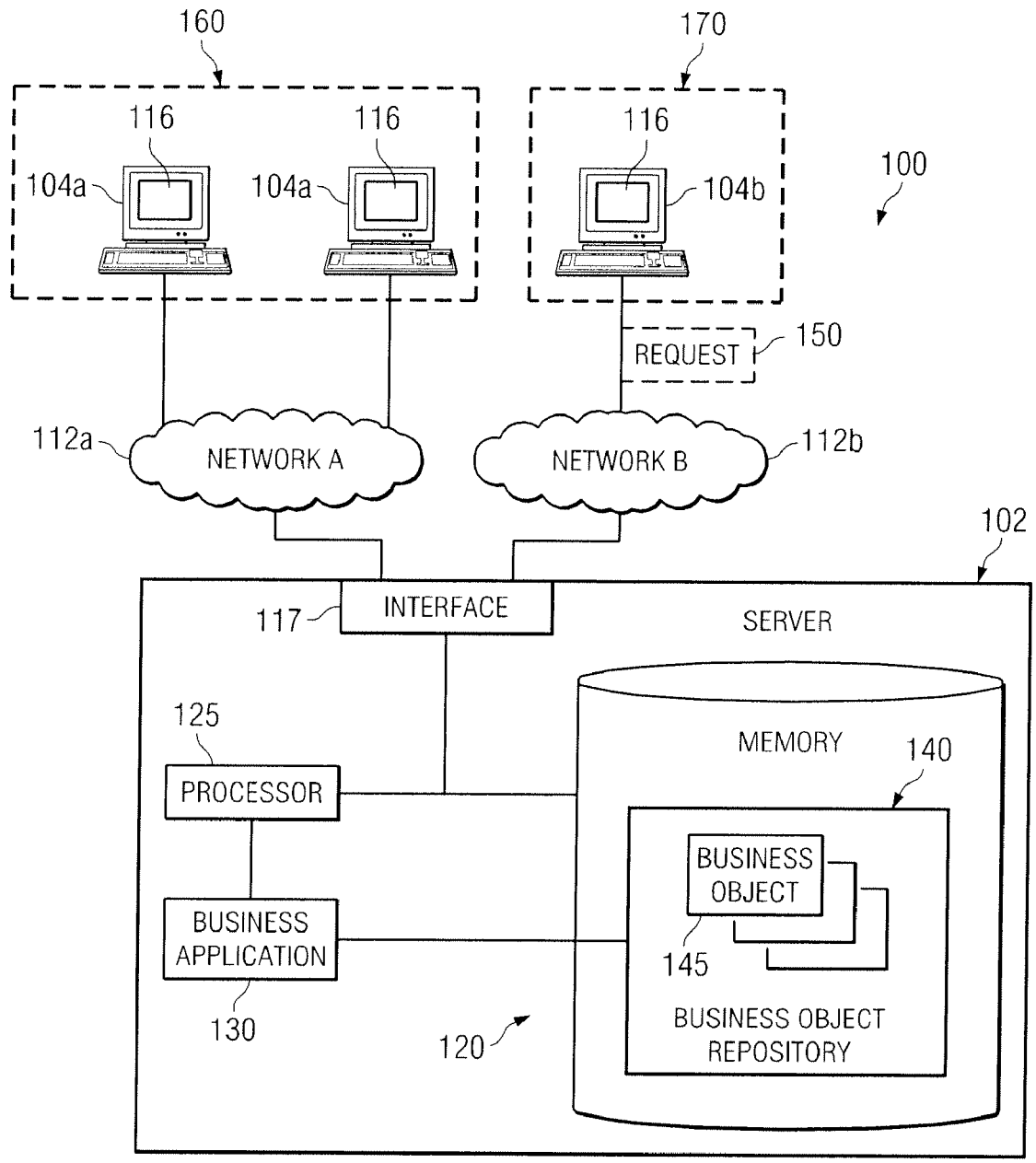
FIG. 1 illustrates an example server environment implementing a logically centralized source for collaboration on objectives according to particular implementations of the present disclosure.

FIG. 1 illustrates a business environment 100 for storing or retrieving (or otherwise managing) information in at least a portion of an enterprise or data processing environment to implement a logically centralized source for collaboration on objectives. In certain embodiments, environment 100 provides a business object 145 located within a business object repository 140 within which the requirements of a plurality of business entities may be collected, corresponding solutions to those requirements may be identified, and one or more of the corresponding solutions may be accepted as an agreement between a solution provider and a requesting entity. For example, a requesting party 160 may have certain requirements for a product to be designed and subsequently manufactured. In some cases, the business object 145 allows for requirements of the requested product to be stored in a logically central location, in this instance the business object repository 140. The solution provider 170 may be provided access to the plurality of requirements through the business object 145 such that proposed solutions may be identified. As the proposed solutions are identified, they may also be stored within the central location along with the identified requirements. There, the requesting entity 160 may review the solutions through use of clients 104a present on network 112a of environment 100, and upon review, accept or reject particular solutions. A solution provider entity 170 may review the requirements through the use of clients 104b present on network 112b of environment 100, and upon review, accept or inquire about particular requirements. If a proposed solution is accepted, users and/or applications of the environment 100 may access the agreed upon solution to review the various elements of the business object 145. In this manner, requesting entities 160 and solution providers 170 may interact and collaborate within a centralized environment storing both the requirements and solutions such that the process of arriving at an agreed upon solution may be simplified for both parties, thus decreasing the time and effort required in the usual exchange of information. Indeed, the business object 145 may be searchable by other (perhaps authenticated) solution providers or requesting entities. In some situations, the solutions stored within business object 145 associated with a first requesting entity 160 may be presented to a second requesting entity when the second requesting entity provides requirements similar to those of the first requesting entity 160. The presentation of the existing business object 145 may be performed automatically through an automated process recognizing the similarities of the requirements, or the presentation may be done manually by searching keywords, metadata, and other data associated with the business object 145.

Turning to the illustrated embodiment, environment 100 may be a distributed client/server system that allows clients 104 to submit requests to store and/or retrieve information from business object repository 145 maintained within memory 120 on server 102. But environment 100 may also be a standalone computing environment or any other suitable environment, such as an administrator accessing data stored on server 102, without departing from the scope of this disclosure. Environment 100 may allow access to individual business objects 145 within the business object repository 140 using access methods such as JAVA, COM/DCOM (Component Object Model/Distributed Component Object Model), CORBA (Common Object Request Broker Architecture), RFC (Remote Function Call), and Hypertext Transfer Protocol (HTTP), or other suitable access methods.

In the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), MACINTOSH, workstation, UNIX-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, LINUX INTEL or LINUX/390, UNIX, WINDOWS Server, or any other suitable operating system. According to one embodiment, server 102 may also include or be communicably coupled with a web server and/or a Simple Mail Transfer Protocol (SMTP) server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes business object repository 140. In some embodiments, the business object repository 140 may be stored in one or more tables in a relational database described in terms of Structured Query Lanuae (SQL) statements or scripts. In the same or other embodiments, the business object repository 140 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the business object repository 140 may comprise one table or file or a plurality of tables or files stored on one computer or across a plurality of computers in any appropriate format. Indeed, some or all of the business object repository 140 may be local or remote without departing from the scope of this disclosure and store any type of appropriate data. In particular embodiments, the business object repository 140 may access the business objects 145 in response to queries from clients 104.

These business objects 145 may represent organized data relating to some project or endeavor, which may or may not be linked, with each object having one or more states related to the object. Each of the states, in turn, may be associated with data that pertains to various modifiable parameters of the individual states of the object. One type of data modeling that includes multiple objects with each having multiple states, and each state having multiple instances of changes to the state's modifiable parameters is the business object model. The overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

In one embodiment, business object repository 140 may be referenced by or communicably coupled with applications executing on or presented to client 104. In some embodiments, the business object repository 140 may be searchable, such as by requests 150 from clients 104 via the network 112. Distinct business objects 145, as well as multiple instances of a single business object 145, may be searched to allow the user and/or application to find a business object 145 type or a specific instance thereof on demand.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with business object repository 140. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain embodiments, server 102 receives requests 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Server 102 may also include or reference a local, distributed, or hosted business application 130. At a high level, business application 130 is any application, program, module, process, or other software that may access, retrieve, modify, delete, or otherwise manage some information of the business object repository 140 in memory 120. Specifically, business application 130 may access the business object repository 140 to retrieve or modify data stored within specific business objects 145 as requested by a user and/or another application. Business application 130 may be considered business software or solution that is capable of interacting or integrating with business object repository 140 located, for example, in memory 120 to provide access to data for personal or business use. An example business application 130 may be a computer application for performing any suitable business process by implementing or executing a plurality of steps. One example of a business application 130 is an application that may provide interconnectivity with one or more business object repositories 140 containing product development information such that records may be dispersed among a plurality of business objects 145. As a result, business application 130 may provide a method of accessing requested data and presenting it to the user and/or application such that the user and/or application are provided information through a Graphical User Interface (GUI) interface 116 in a centralized manner. Business application 130 may also provide the user with a computer implementable method of implementing a centralized source for agreements on one or more solutions identified by a solution provider.

More specifically, business application 130 may be a composite application, or an application built on other applications, that includes an object access layer (OAL) and a service layer. In this example, application 130 may execute or provide a number of application services, such as CRM systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 130 to orchestrate a business process in synchronization with other existing processes (e.g., native processes of enterprise base systems) and leverage existing investments in the information technology (IT) platform. Further, composite application 130 may run on a heterogeneous IT platform. In doing so, composite application 130 may be cross-functional in that it may drive business processes across different applications, technologies, and organizations. Accordingly, composite application 130 may drive end-to-end business processes across heterogeneous systems or sub-systems. Application 130 may also include or be coupled with a persistence layer and one or more application system connectors. Such application system connectors enable data exchange and integration with enterprise subsystems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 130, it may instead be a standalone or (relatively) simple software program. Regardless, application 130 may also perform processing automatically, which may indicate that the appropriate processing is substantially performed by at least one component of system 100. It should be understood that this disclosure further contemplates any suitable administrator or other user interaction with application 130 or other components of system 100 without departing from its original scope. Finally, it will be understood that system 100 may utilize or be coupled with various instances of business applications 130. For example, client 104 may run a first business application 130 that is communicably coupled with a second business application 130. Each business application 130 may represent different solutions, versions, or modules available from one or a plurality of software providers or developed in-house.

For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 130 may be stored, referenced, or executed remotely. For example, a portion of application 130 may be a web service that is remotely called, while another portion of application 130 may be an interface object bundled for processing at remote client 104. Moreover, application 130 may be a child or sub-module of another software module or enterprise application (not illustrated) without departing from the scope of this disclosure. Indeed, application 130 may be a hosted solution that allows multiple parties in different portions of the process to perform the respective processing. For example, client 104 may access application 130, once developed, on server 102 or even as a hosted application located over network 112 without departing from the scope of this disclosure. In another example, portions of software application 130 may be developed by the developer working directly at server 102, as well as remotely at client 104. Regardless of the particular implementation, "software" may include software, firmware, wired or programmed hardware, or any combination thereof as appropriate. Indeed, each of the foregoing software applications may be written or described in any appropriate computer language including C, C++, JAVA, VISUAL BASIC, assembler, PERL, any suitable version of 4GL, as well as others. It will be understood that while these applications are shown as a single multi-tasked module that implements the various features and functionality through various objects, methods, or other processes, each may instead be a distributed application with multiple sub-modules. Further, while illustrated as internal to server 102, one or more processes associated with these applications may be stored, referenced, or executed remotely. Moreover, each of these software applications may be a child or sub-module of another software module or enterprise application (not illustrated) without departing from the scope of this disclosure.

Network 112 facilitates wireless or wireline communication between computer server 102 and any other local or remote computer, such as clients 104. Indeed, while illustrated as two networks, 112*a* and 112*b* respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least user interface 116 and comprises an electronic computing device operable to receive, transmit, process and store any appropriate data associated with environment 100. It will be understood that there may be any number of clients 104 communicably coupled to server 102, and clients 104 may be requesting parties 160, solution providers 170, or other entities. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via user interface 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or user interface 116. Both the input device and output device may include fixed or removable storage media such as a magnetic computer disk, CD-ROM, or other suitable media to both receive input from and provide output to users of clients 104 through the display, namely user interface 116.

In some implementations, user interface 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. GUI 116 may provide access to the front-end of business application 130 executing on client 104 that is operable to access one or more business objects 145 stored within business object repository 140. In another example, GUI 116 may display output reports such as summary and detailed reports. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Mozilla Firefox) and return the appropriate HTML or XML responses using network 112. For example, server 102 may receive a request 150 from client 104 using the web browser and then execute the request 150 to store and/or retrieve information and data from a business object 145 stored within business object repository 140.

Figure 2:
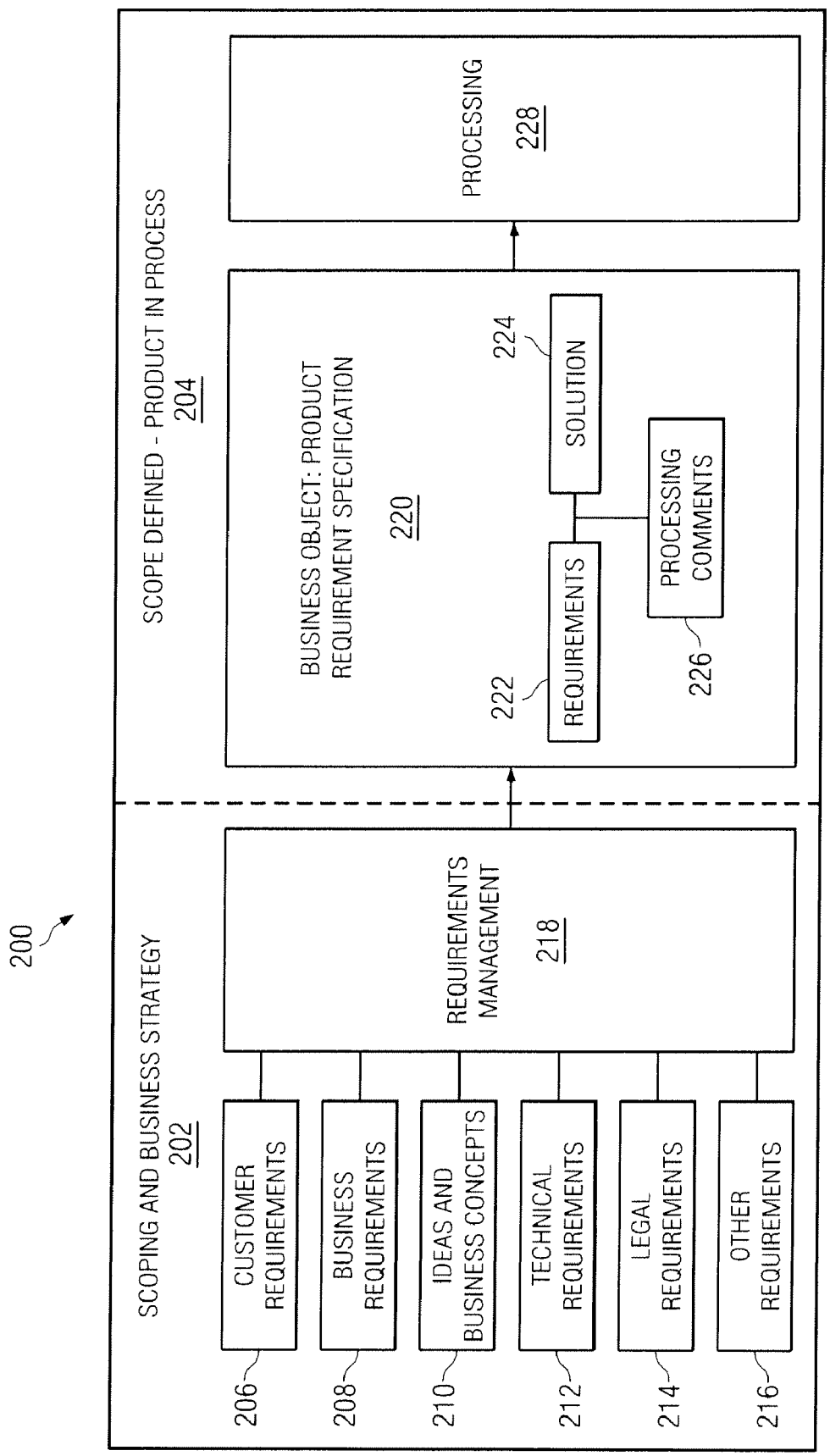
FIG. 2 is a diagram illustrating an example system for performing the requirement gathering process and solution creation environment as utilized by the example system of FIG. 1.

FIG. 2 illustrates an example system implementing a logically centralized source for agreements on objectives for a business entity. A business entity may be defined as a product, such as machinery, a software application, or a service, that may be priced, ordered, purchased, or maintained. The business entity may also be a package comprising a combination of products, such that the package itself may be defined as a business entity. Generally, a business entity may be represented as a good, service, intermediate part, or other item, such that it is produced or created upon the request or need of a requesting party and designed or manufactured by a solution provider.

System 200 of FIG. 2 is divided into two example parts— (1) scoping and business strategy 202 and (2) scope defined/product in process 204. Scoping and business strategy 202 illustrates an example of the plurality of sources that govern the definition of a business entity's scope and requirements. In the example embodiment of FIG. 2, those inputs include customer requirements 206, business requirements 208, ideas and business concepts 210, technical requirements 212, legal requirements 214, and other requirements 216.

Customer requirements 206 may list the tasks and goals of the customer. Customer requirements 206 may be intended to make an existing business entity easier to use or faster, or define the intended uses and effects of a new business entity. Business requirements 208 may list the goals of the business. At the highest level, the business goals 208 may include the increase of revenue, a decrease of costs, a specific improvement of the existing business entity, an improvement of the business entity's efficiency, and so on. Ideas and business concepts 210 may include earlier versions of the business entity designed by the customer or the requesting entity, specific ideas regarding the functionality or implementations of the business entity, as well as other concepts developed prior to developing the requirements. The ideas and business concepts 210 may be considered requirements in the sense that they indicate a type or example of the solution desired. Technical requirements 212 may include the hardware and software integration issues such as security, compatibility, performance requirements, and the like. In a product manufacturing example, technical requirements 212 may include manufacturing requirements such as the conditions, processes, materials, and/or tools required. The technical requirements 212 may be high-level requirements, such as requiring a business entity to possess networking capabilities, or specific requirements such as providing that specific portions of programming code be included within the solution. Legal requirements 214 may include notices required to be on or within a business entity, legal minimums for specifications that should be met (e.g. car safety standards), as well as labor requirements that the provided solution should meet in producing the business entity. Additionally, the other requirements 216 represent those requirements not specifically included above that may be provided by the requesting party. Some examples may include the development processes, methods, and techniques that may be used in development of the business entity, as well as other various requirements. This list of requirements is not meant to be exclusive, but rather an example of the sources for requirements present in the embodiment of FIG. 2.

Requirements management system 218 acts as conduit for the various requirements generated in the scoping and business strategy 202 section of FIG. 2. Requirements management may be defined as the art of gathering and managing requirements within a business entity development project. In some examples, requirements management system 218 may be embodied as a particular third party commercial requirements management tool. In other examples, the requirements management system 218 may represent a manual collection of the requirements identified in the scoping and business strategy 202 stage of FIG. 2. The manual collection of requirements may be performed by an individual, a team of persons, or through various collaborations within a computerized document. Regardless of its specific embodiment, the requirements management system 218 collects the identified requirements and provides them to the business object 220.

Business object 220 resides in the scope defined/product in progress 204 section of system 200. This section represents the system once the scope and requirements of the business entity have been defined, and the process of providing a solution to meet those defined requirements begins. In the present example, business object 220 is named Product Requirement Specification. Within the business object 220 may reside the identified requirements 222, proposed solutions 224 meeting those requirements, and processing comments 226 included for when the business entity enters the actual processing phase of development. The identified requirements 222 may represent the collection of requirements as collected by the requirements management system 218 during the scoping and business strategy 202 portion of FIG. 2. Those requirements may be provided to the business object 220 and stored therein as requirements 222.

Once the scope is defined, the solution provider may offer solutions fulfilling the identified requirements 222. In one example, the solution provider may identify or specify one overall solution for the requirements. This solution can be described by several specification items that give a response to the requirement items. In some cases, multiple solutions may be identified such that a plurality of solutions, perhaps utilizing various vendors or suppliers, are offered and (occasionally prioritized). Each solution may be included within one business object 220 such that the solutions 224 component contains a plurality of identified specification items for review by the requesting party as well as by members of the solution provider. Each solution may include multiple documents, such as a detailed specification, a feasibility determination, concept figures, as well as others. Regardless of the form taken, each solution may be a precise, complete, and quantifiable description of the identified solution such that the requirements of the requesting party may be met and/or exceeded. The solutions 224 component may be viewable by both the requesting party and the solution provider. In some examples, the solutions may be viewable prior to their completion. In that manner, the requesting party may interact with the solutions provider in order to assist in the development process. For instance, the requesting party may, while viewing a solution in progress, provide feedback and commentary to the solution provider such that the solution being developed more closely realizes the business entity desired by the requesting party. As the single location for the identified solutions, solutions 224 component provides a method for requesting parties to stay up-to-date on potential solutions and become an active player in the design process, helping to facilitate better solutions at a quicker pace.

The information within business object 220 may focus specifically on the requirements 222 and solutions 224 for the business entity as opposed to the processing of the entity after agreement on a particular solution by the parties. While business object 220 may not include a processing layer, it may include a processing comments 226 component. The processing comments 226 component represents comments related to the processing stage of development. For instance, the use of a specific brand of materials for a client may be included in the processing comments 226 based on client preference, where the specific brand was not a part of the requirements 222 or identified solutions 224. These processing comments 226 may be hidden from the requesting party such that only the solution provider may view them. In those situations, the processing comments 226 may remain internal to the solution provider, allowing the processing comments 226 to act as a clipboard for notes, reminders, and other relevant information not included within the agreed upon solution.

In the scope defined/product in process 204 section, the business object 220 may later be used in processing 228. The identified solution 224 that has been agreed upon by the parties may be provided to a processing entity 228 for manufacturing, development, or further processing. The processing entity 228 may represent the same or another section of the solution provider, a manufacturing unit of the requesting party, or a third-party who will be processing or manufacturing the business entity defined by the business object 220. In this way, business object 220 may be independent of the processing stage, allowing for the requesting party to focus on well-defined requirements as opposed to the final product itself, thus resulting in better solution development. The business object 220 will be explained in detail through FIGS. 3A and 3B-1-3B3.

Figure 3A:
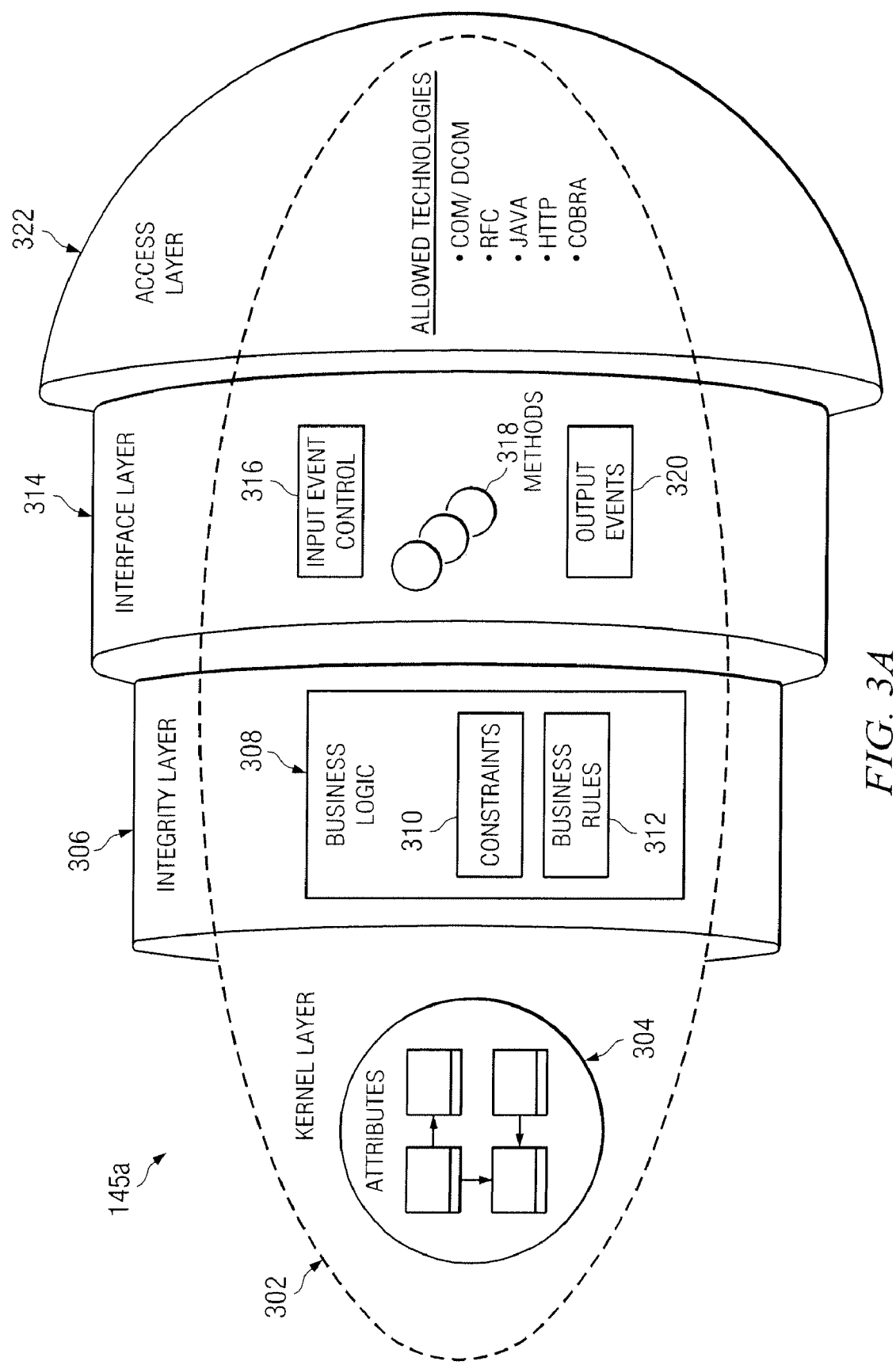
FIG. 3A is a diagram of an example generic business object in a particular implementation of FIG. 1.

FIG. 3A illustrates the structure of a generic business object 145a in environment 100. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjointed, i.e., the same business information is represented once. A business object may be defined such that it contains multiple layers, such as in the example business object 145 of FIG. 3A. The example business object 145 contains four layers: the kernel layer 302, the integrity layer 306, the interface layer 314, and the access layer 322. The innermost layer of the example business object is the kernel layer 302. The kernel layer 302 represents the business object's 145 inherent data, containing various attributes of the defined business object. The second layer represents the integrity layer 306. In the example business object 145, the integrity layer 306 contains the business logic 308 of the object. Such logic may include business rules 312 for consistent embedding in the environment 100 and the constraints 310 regarding the values and domains that apply to the business object 145. Business logic 308 may comprise statements that define or constrain some aspect of the business, such that they are intended to assert business structure or to control or influence the behavior of the business entity. It may pertain to the facts recorded on data and constraints on changes to that data. In effect, business logic 308 may determine what data may, or may not, be recorded in business object 145a. The third layer, the interface layer 314, may supply the valid options for accessing the business object 145 and describe the implementation, structure, and interface of the business object to the outside world. To do so, the interface layer 314 may contain methods 318, input event controls 316, and output events 320. The fourth and outermost layer of the business object 145 in FIG. 3A is the access layer 322. The access layer 322 defines the technologies that may be used for external access to the business object's 145 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and JAVA, among others. Additionally, business objects 145a of this embodiment may implement standard object-oriented technologies such as encapsulation, inheritance, and/or polymorphism.

Figures 1, 3B:
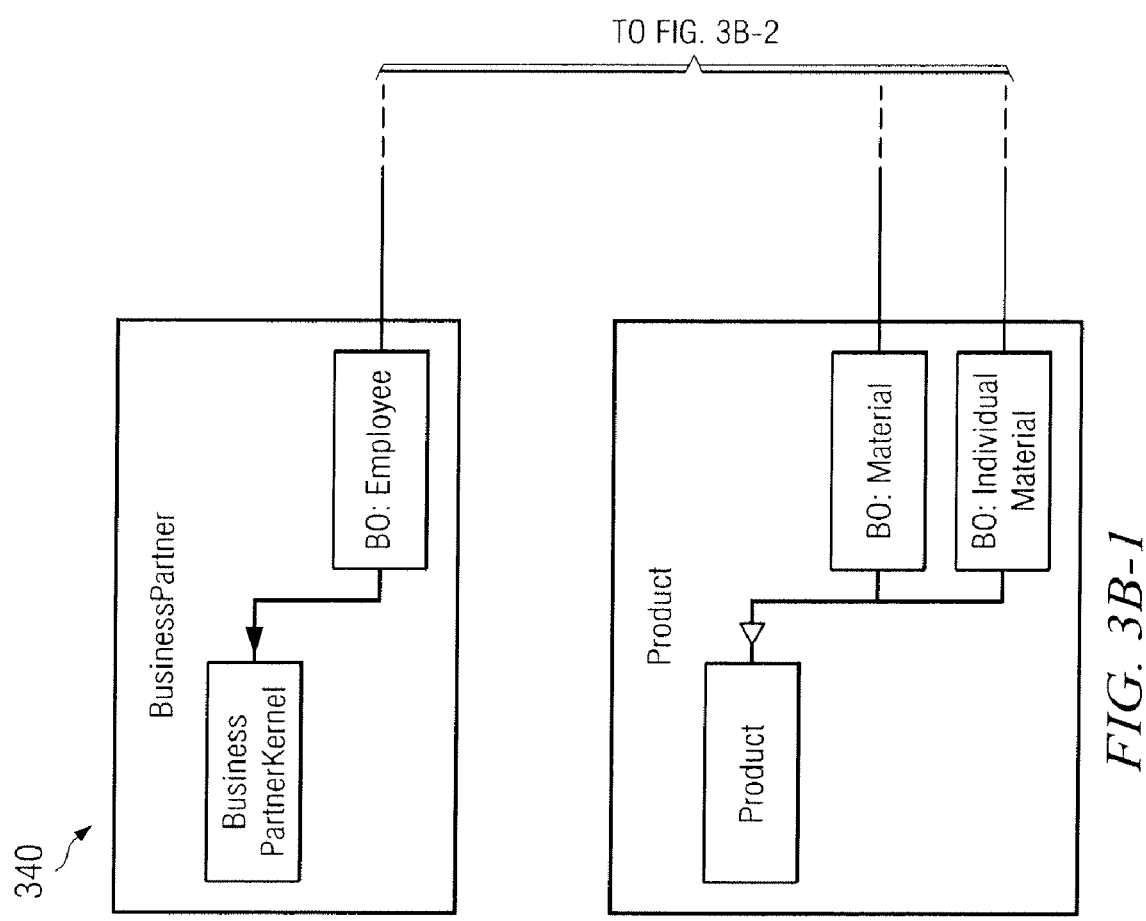
Figures 2, 3B:
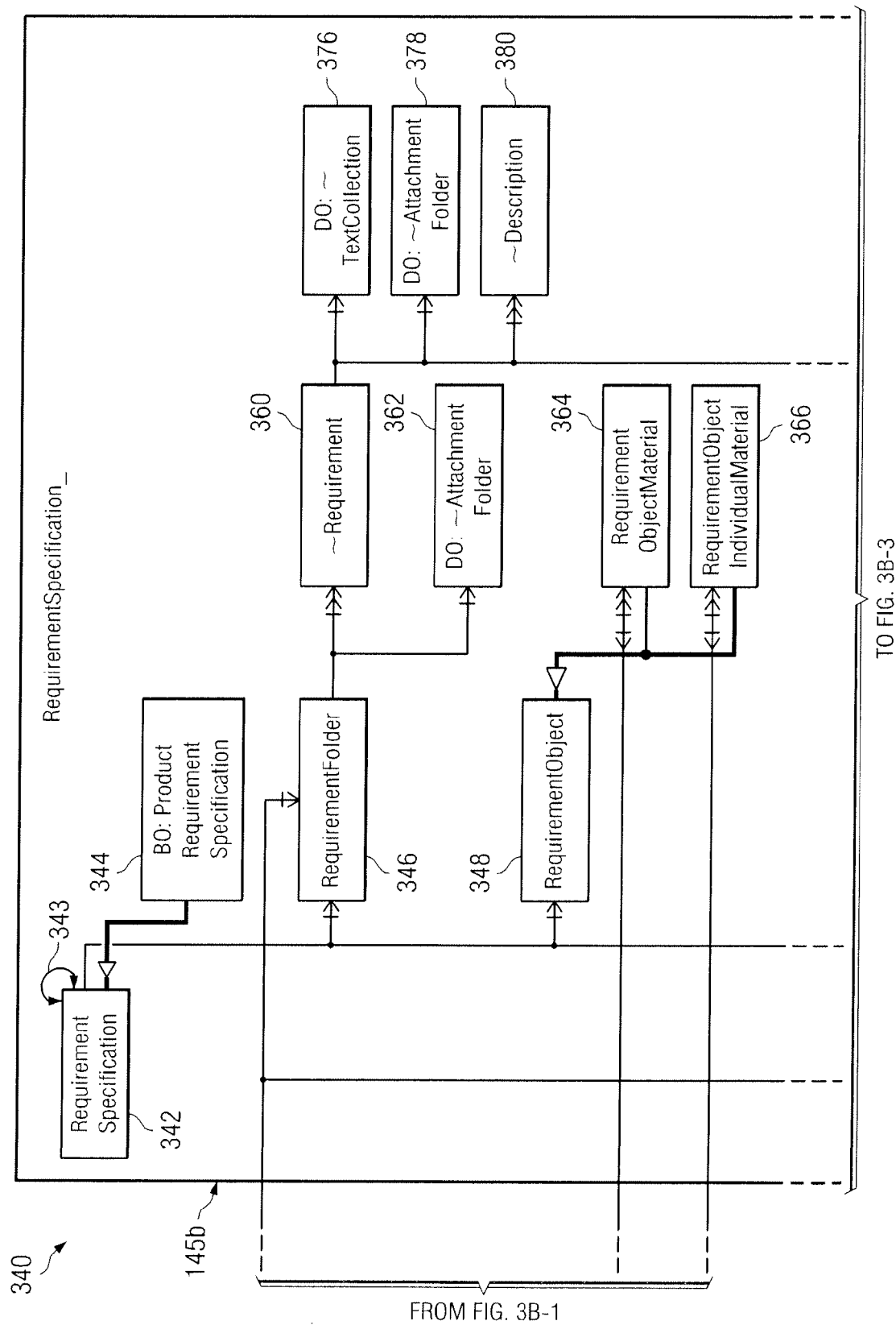
Figures 3, 3B:
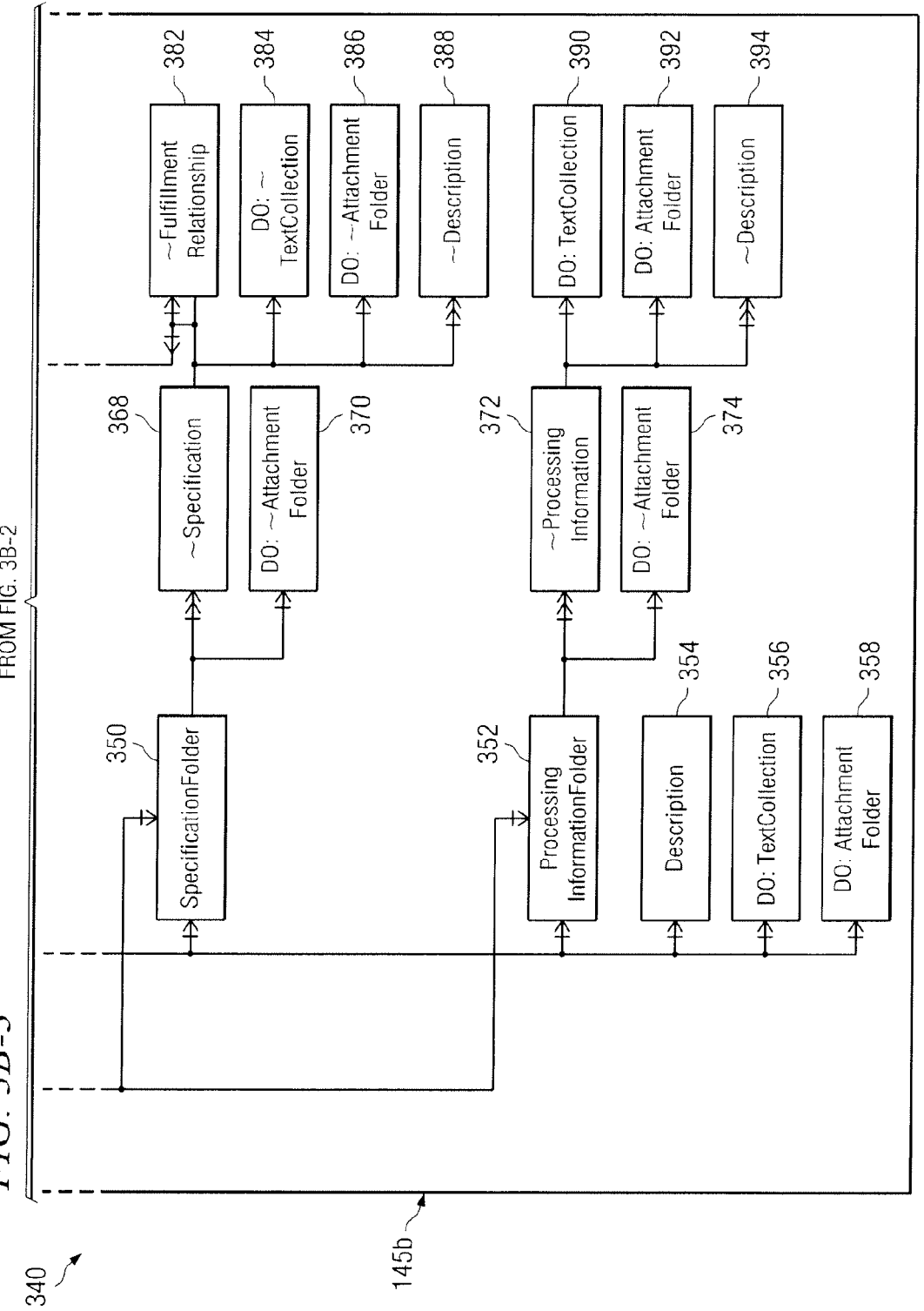

FIGS. 3B-1-3B3 illustrate another example of a business object 145b represented in a hierarchically arranged structure 340. The following provides a brief overview of the business object model. In the business object model, the business object 145 may be arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects may be arranged from the top to the bottom based on defined order of the business areas.

To ensure the consistency of interfaces, the business object model may be built using standardized data types as well as packages to group related elements together, and package templates and entity templates to specify the arrangement of packages and entities within the structure.

Data Types

Data types are used to type object entities and interfaces with a structure. This typing can include business semantic. For example, the data type BusinessTransactionDocumentID is a unique identifier for a document in a business transaction. Also, as an example, data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves can be based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typically typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order entity is used in a Purchase Order Request. These entities are created using the data types defined above to ensure the consistent representation of data throughout the entities.

Packages

Packages group the entities in the business object model and the resulting interfaces into groups of semantically associated information. Packages also may include "sub"—packages, i.e., the packages may be nested.

In the example of FIGS. 3B-1-3B3, the business object 145b is named RequirementSpecification, and contains information relating to the requirements 222, the solutions 224, and the processing comments 226 components of FIG. 2. Each instance of RequirementSpecification is a unique version and has its own VersionUUID. Instances that belong to the same business entity share the same ID. Two instances of RequirementSpecification have a different ID if they are not versions of the same business entity, such as window shutters for two different buildings of different customers.

The business object named RequirementSpecification 145b is divided into three main parts: RequirementFolder 346, SpecificationFolder 350, and ProcessingInformationFolder 352. The first part is the RequirementFolder 346, representing the collection of requirements for a business entity within a given business context (e.g. a Prototype, Development Project, Sales Order). The second part is the corresponding SpecificationFolder 350 covering specifications to define the properties of the intended use and behavior of this business entity, defined by the requirements. The third part is the collection of information relevant for in-house processing represented by the ProcessingInformationFolder 352. The RequirementObject 348 specifies the Object(s) that are necessary to fulfill the RequirementSpecification.

The elements located directly at the root node RequirementSpecification may be defined by the data type RequirementSpecificationElements. These elements may include VersionUUID, ID, VersionID, SystemAdministrativeData, Name, RequirementSpecificationKey, and Status. The following composition relationships to subordinate notes may exist:

| | |
|---|---|
| Description | 1:cn |
| RequirementSpecificationRelationship | 1:cn |
| RequirementFolder | 1:c |
| RequirementObject | 1:cn |
| SpecificationFolder | 1:c |
| ProcessingInformationFolder | 1:c |
| TextCollection (DO) | 1:c |
| AttachmentFolder (DO) | 1:c. |

Queries to RequirementSpecification 145b may be performed as a QueryByKey, QueryByElements, or SelectAll. QueryByKey may deliver a list of RequirementSpecifications for a given UUID, ID, or Version ID combination. The query elements are defined by the data type RequirementSpecificationIDQueryElements. QueryByElements may deliver a list of RequirementSpecifications for given Elements, which may have been queried by parameters, which exist in the UI of the RequirementSpecifications. The query elements may be defined by the data type RquirementSpecificationElementsQueryElements, and may include UUID, ID, VersionID, SystemAdministrativeData, CreationBusinessPartnerCommonPersonNameGivenName, CreationBusinessPartner CommonPersonNameFamilyName, LastChangeBusinessPartnerCommonPersonNameGivenName, LastChangeBusinessPartnerCommonPersonNameFamilyName, Name, Status, RequirementFolderResponsibleEmployeeUUID, RequirementFolderResponsibleEmployeeID, RequirementFolderResponsibleGivenName, RequirementFolderResponsibleFamilyName, RequirementID, RequirementName, RequirementCreationProcessingStatusCode, RequirementSolutionProposalStatusCode, MaterialUUID, MaterialID, IndividualMaterialUUID, and IndividualMaterialID. SelectAll may be used to select appropriate entries in the business object 145b.

Description 354 may be a representation of the properties of a RequirementSpecification in natural language. The elements located at the description node may be defined by the data type RequirementSpecificationDescriptionElements. These elements may include description, as well as other elements. TextCollection (DO) 356 may be a natural-language text describing the RequirementSpecification 342, and the AttachmentFolder (DO) may be an electronic document of any type, such as a word document, drawing, note, or other type, whose content is related to the RequirementSpecification 342 under examination.

RequirementSpecificationRelationship 343 refers to the relationship of two instances of a RequirementSpecification 145b such that a definition of a common context exists. When a complex business entity is requested, several instances of RequirementSpecification 145b may be reasonable to distinguish between different areas of the requirements. Nevertheless, those instances may be linked to each other to express a common context. An example for a common context may be the relationship between a RequirementSpecification 145b in a customer quotation and another RequirementSpecification in a subsequent sales order. The elements located at the node RequirementSpecificationRelationship may be defined by the data type RequirementSpecificationRelationshipElements. These elements may include UUID, VersionUUID, RequirementSpecificationKey, RequirementSpecificationID, and RequirementSpecificationVersionID. In order to build a relationship between two instances of RequirementSpecification 145b, at least the UUID of the RequirementSpecification 145b or the RequirementSpecificationKey is typically provided.

RequirementFolder 346 may be a collection of requirements needed for a business entity. It may include the central information that is relevant for subsequent single requirements. RequirementFolder 346 may be introduced to separate assigned Requirements from Specifications and Processing Information. Therefore, RequirementFolder 346 acts a common anchor for assigned Requirements. The elements located at the node RequirementFolder 346 may be defined by the data type RequirementSpecificationFolderElements. These elements may include UUID, ResponsibleEmployeeUUID, ResponsibleEmployeeID, Status, and SystemAdministrativeData. The following composition relationships to subordinate notes may exist:

| | |
|---|---|
| RequirementFolderRequirement | 1:cn |
| RequirementFolderAttachmentFolder (DO) | 1:c. |

RequirementFolderRequirement 360 may be a natural-language or property-based description of direct needs and expectations relevant for a planned or existing business entity. The contents of the RequirementFolderRequirement 360 may be in contrast to a specification in that the requirements do not need to be precise or complete and detailed, but they may be required to contain essential properties. Typical qualifiers may include good, regular, not relevant, easy, or stable. One example of the RequirementFolderRequirement 360 may be a window shutter the requirement for handling that includes the following options: manual handling, handling from inside with less expenditure of energy, or automatic handling. The elements located at the node RequirementFolderRequirement 360 may be defined by the data type RequirementSpecificationRequirementFolderRequirementElements. These elements may include UUID, ID, Name, RequirementPriorityCode, Status, or SystemAdministrativeData. The following composition relationships to subordinate nodes exist:

| | |
|---|---|
| Description | 1:cn |
| RequirementFolderRequirementTextCollection (DO) | 1:c |
| RequirementFolderRequirementAttachmentFolder (DO) | 1:c. |

RequirementFolderRequirementDescription 380 may be a representation of the properties of a RequirementFolderRequirement 360 in natural language. The elements located at the description node may be defined by the data type RequirementSpecificationRequirementFolderRequirementDescriptionElements. One example of the elements therein may be a Description element. RequirementFolderRequirementTextCollection (DO) 376 may be natural-language text describing the RequirementFolderRequirement 360. RequirementFolderRequirementAttachmentFolder (DO) 378 may be an electronic document of any type, such as a word document, drawing, note, or other type, whose content is related to the RequirementFolderRequirement 360 under examination. RequirementFolderAttachmentFolder (DO) may be an electronic document of any type, whose content is related to the RequirementFolder 346 under examination.

RequirementObject 348 may be a business object that is requested to fulfill the requirements. The basic information may be the type of the required business object, which may be, for example, a material. Furthermore, a RequirementObject 348 may also contain administrative information. RequirementObject 348 occurs in the following disjoint and incomplete specializations: RequirementObjectMaterial 364 and RequirementObjectIndividualMaterial 366. The specializations may specify the business object connected to the RequirementSpecification 342. The RequirementObject 348 occurs, at maximum, only once in the specialization of a RequirementObjectMaterial 364 and only once in the specialization of a RequirementObjectIndividualMaterial 366. For each specialization at least a Material, Individual Material, or a Product Category assignment should exist. RequirementObjectMaterial 364 may define a material that is supposed to fulfill the RequirementSpecification 342. In addition, a RequirementObjectMaterial 364 contains identifying information including, for example, UUID, ID, and SystemAdministrativeData. RequirementObjectIndividualMaterial 366 may represent an Individual Material that is the material that is supposed to fulfill the RequirementSpecification 342. In addition, a RequirementObjectIndividualMaterial 366 may contain identifying information such as UUID, ID, and SystemAdministrativeData.

SpecificationFolder 350 may be a collection of one or more specifications that define the fulfillment of the requirements of a business entity. It may cover the information that is relevant for subsequent single specifications. The SpecificationFolder 350 may be introduced to separate the assigned specifications against requirements and processing information. It may therefore act as a common anchor for assigned specifications. The elements located at the node SpecificationFolder 350 may be defined by the data type RequirementSpecificationSpecificationFolderElements. These elements may include UUID, ResponsibleEmployeeUUID, ResponsibleEmployeeID, Status, and SystemAdministrativeData. The following composition relationships to subordinate nodes may exist:

| | |
|---|---|
| SpecificationFolderSpecification | 1:cn |
| SpecificationFolderAttachmentFolder (DO) | 1:c. |

SpecificationFolderSpecification 368 may be the precise definition of one or more features and how they fulfill one or more requirements of the business entity. In contrast to a requirement, the content of a specification may be precise, complete and quantifiable or measurable. It may combine technical, legal or other constraints that may define the usage, behavior, and maintenance of the delivered business entity with a focus on the requirements. It may also include warnings in case of abuse. The specification is not a design or implementation and therefore does not contain the design. The elements located at the node SpecificationFolderSpecification 368 may be defined by the data type RequirementSpecificationSpecificationFolderSpecificationElements. These elements may include UUID, ID, Name, Status, and SystemAdministrativeData. The following composition relationships to subordinate nodes may exist:

| | |
|---|---|
| Description | 1:cn |
| SpecificationFolderSpecificationFulfillmentRelationship | 1:cn |
| SpecificationFolderSpecification TextCollection (DO) | 1:c |
| SpecificationFolderSpecificationAttachmentFolder (DO) | 1:c. |

SpecificationDescription 388 may be a representation of the properties of a SpecificationFolderSpecification 368 in natural language. The elements located at the description node may be defined by the data type RequirementSpecificationSpecificationFolderSpecificationDescriptionElements. One example of the elements therein may be Description. SpecificationFolderSpecificationTextCollection (DO) 384 may be a natural-language text describing the SpecificationFolderSpecification 368. SpecificationFolderSpecification AttachmentFolder (DO) 386 may be an electronic document of any type, such as a word document, drawing, note, or other type, whose content is related to the SpecificationFolderSpecification 368 under examination. SpecificationFolderSpecificationFulfillmentRelationship 352 may define a relationship of a specification that contributes to the fulfillment of one or multiple requirements. During the creation process of specifications it may be important to assign such a specification to one or more requirements, even if a specification is not yet released and the fulfillment of the requirement(s) has not been approved. This may allow the determination of whether specifications are already in process in the early stages of development. In some cases no specification is required for requirements. If that is the case, then these requirements are marked as self-specified by a corresponding status value. For example, a window shutter business entity that has the requirement "manual handling, handling from inside with less expenditure of energy" may be fulfilled by multiple solutions (handling by belt, crank or lever). With the assignment of a specification to the requirement, it will be documented how the requirement will be fulfilled, such as by "handling by crank". The elements located at the node SpecificationFolderSpecificationFulfimentRelationship may be defined by the data type SpecificationFolderSpecificationFulfimentRelationshipElement. These elements may include SpecificationFolderSpecificationUUID, RequirementFolderRequirementUUID, and SystemAdministrativeData. SpecificationFolderAttachmentFolder (DO) 386 may be an electronic document of any type, such as a word document, drawing, note, or other type, whose content is related to the SpecificationFolder 350 under examination.

ProcessingInformationFolder 352 may be a collection of information that is relevant for the subsequent processing of the business entity in terms of, for example, production, storage and transportation. In contrast to the content of the SpecificationFolderSpecification 368, the enclosed information may be intended primarily for a manufacturer's internal use. This content may be strongly related to the entire value chain that is to provide the business entity. Therefore this information may be hidden and considered as not relevant to an external customer. The elements located at the node ProcessingInformationFolder 352 may be defined by the data type RequirementSpecificationProcessingInformationFolder Elements. These elements may include UUID, ResponsibleEmployeeUUID, ResponsibleEmployeeID, Status, and SystemAdministrativeData. The following composition relationships to subordinate nodes may exist:

| | |
|---|---|
| ProcessingInformationFolderProcessingInformation | 1:cn |
| ProcessingInformationFolderAttachmentFolder (DO) | 1:c. |

ProcessingInformationFolderProcessingInformation 372 may be any definition, information or instruction that is important for an optimized in-house processing, for example, in terms of production, packaging or storage. This set of information may be intended for in-house processing but not limited to it. In the case of collaboration between manufacturers, the manufacturers may want to share this information because they share the value chain of the business entity. It may need to be outlined that the stakeholder of the requested business entity does not need to know this information and is typically not allowed to know it. The elements located at the ProcessingInformationFolderProcessingInformation 372 may be defined by the data type RequirementSpecificationProcessingInformationFolder-ProcessingInformationElements. These elements may include UUID, ID, Name, and SystemAdministrativeData. Additionally, the following composition relationships to subordinate nodes may exist:

| | |
|---|---|
| Description | 1:cn |
| ProcessingInformationFolderProcessingInformation-TextCollection (DO) | 1:c |
| ProcessingInformationFolderProcessingInformation-AttachmentFolder (DO) | 1:c. |

ProcessingInformationFolder-ProcessingInformationDescription 394 may be a representation of the properties of a ProcessingInformationFolder-ProcessingInformation 372 in natural language. The elements located at the description node are defined by the data type RequirementSpecificationProcessingInformationFolder ProcessingInformationDescriptionElements. These elements may include Description and other elements. ProcessingInformationFolder-ProcessingInformationTextCollection (DO) 390 may be a natural-language text describing the ProcessingInformationFolderProcessingInformation 372. ProcessingInformationFolder ProcessingInformationAttachmentFolder (DO) 392 may be an electronic document of any type, such as a word document, drawing, note, or other type, the content of which is related to the ProcessingInformationFolder-ProcessingInformation 372 under examination. ProcessingInformationFolderAttachmentFolder (DO) 374 may be an electronic document of any type, the content of which is related to the ProcessingInformationFolder 352 under examination.

The hierarchical structure of FIGS. 3B-1-3B3 and the portions of business object 145*b* represent one example of a business object 145*b* in environment 100. In other implementations, different structures and elements may comprise the system. Accordingly, the above description does not define or constrain the disclosure to the particular embodiment shown.

Figure 4:
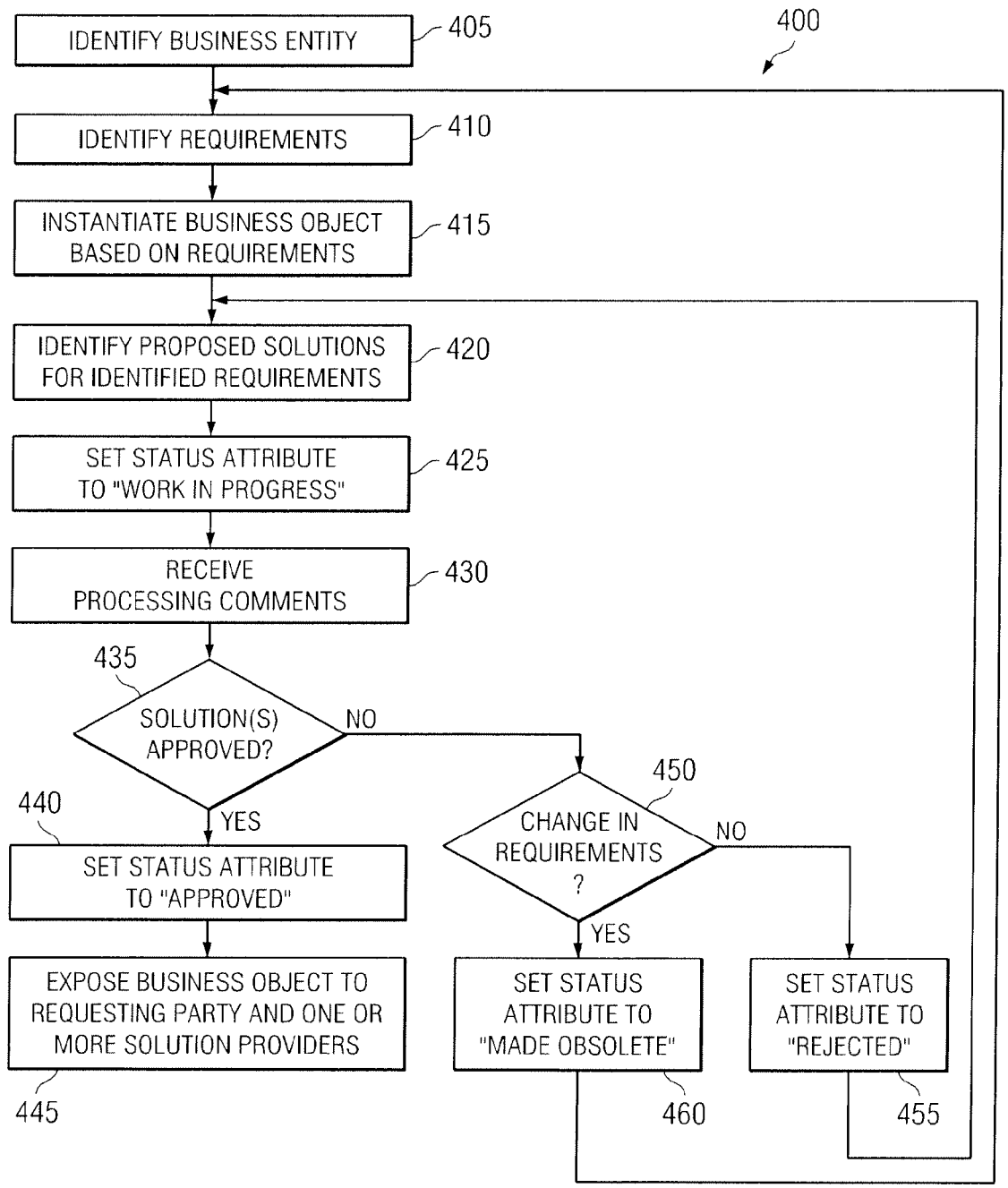
FIG. 4 is a flowchart illustrating an example method of using a business object to identify business entity requirements and associated solutions such that both may be reviewed by the requesting entity and solution provider to develop an acceptable solution in a particular implementation of FIG. 1.

FIG. 4 is a flowchart diagram illustrating method 400 for implementing a logically centralized source for agreements on objectives through the use of a business object 145 in which the requirements and solutions for a business entity may be collected. Method 400 starts with a business entity being identified at step 405. Identifying a business entity entails the process where the requesting party defines the product or service it wants to develop. For example, the business entities identified may be a golf club generating additional distance, a more efficient automobile engine, or a streamlined customer service process for a call center. Identifying the business entity may include setting the goals or defining the intended outcome of a product or service to be designed. A business entity may be loosely defined such that upon taking the requirements of the requesting entity, the solution provider may provide multiple solutions encompassing multiple variations of the ultimate business entity produced.

Once the business entity is defined in step 405, the requesting party identifies the requirements that the business entity should meet in order to be acceptable. As listed in the description of FIG. 2, some examples of requirements identified may include customer requirements 206, business requirements 208, ideas and business concepts 210, technical requirements 212, legal requirements 214, and other assorted requirements 216. In a large organization, identifying the requirements may include a large-scale request for requirements from multiple departments and employees. In a smaller organization, a small group of individuals, or possibly a single employee, may be responsible for identifying the requirements of a business entity. Some requirements may originate outside the requesting party, such as legal requirements defined by law or technical standards adopted by an industry. Additionally, some requirements may be identified by a third party for whom the requesting party may be providing the business entity. Regardless of the requirements' origin, step 410 includes providing them to a requirements management system 218 for centralized storage.

Once the requirements have been collected by the requirements management system 218, a business object 145 is instantiated at step 415 with attributes based on the requirements provided in step 410. Instantiating a business object 145 involves the creation of a new instance of the business object 145 shown in FIG. 1. The structure of the business object 145 may be similar to business objects 145*a* or 145*b* of FIGS. 2 and 3, respectively. When instantiated, the business object 145 receives the requirements from the requirements management system 218 and populates the attributes into the business object 145 structure. In addition to the attributes provided by the requirements management system 218, other attributes may be set. For instance, an ownership attribute may be set as to reflect the person responsible for creating the current instance of the business object 145. Additionally, a status attribute associated with the business object 145 may track the progress of the current instance, such as by providing entities interacting with the business object 145 a quick indication of the current status of the design process. Upon instantiation, the status attribute may be set to indicate that no solutions have yet been provided, for example, through an attribute value of "initialized." Status attributes may be set for both the requirement 222 component and the solution 224 component. The business object 145 in this example may be used in a plurality of instances, such that a plurality of business objects 145 may be associated with a plurality of business entities. In this way, the business object 145 may be used with any type of business entities, from basic products to detailed procedures. As such, the business object 145 offers a scalable and flexible approach to the design process that allows businesses and organizations of any size an easy-to-use method for designing business entities.

When the business object 145 is populated with attributes from the requirements management system 218, the requirements may be stored with the requirements 222 component of the business object 145. The requirements 222 component may be accessible to the solution provider such that solutions may be identified that suit the identified requirements at step 420. The proposed solutions may be identified by the solutions provider by storing them within the solution 224 component of the business object 145. The solutions may be stored in a manner similar to business object 145b of FIGS. 3B-1-3B3, such that the data is stored in a hierarchical manner within the specification folder 350. As solutions are identified, they are accessible by the requesting party, for example, through a GUI 116 on client 104 of FIG. 1. In this manner, the requesting party may be active in the solution development stage of the design, providing valuable real-time feedback on the work of the solution provider. By integrating the feedback received, solution providers may develop acceptable solutions to the requesting party's requirements at a quicker pace due to earlier and more frequent feedback. At step 420, one solution or many solutions may be identified in any given iteration of the method 400.

When a solution or a portion thereof is identified, the status attribute may be set at step 425 to the value of "work in progress," or another value such that the requesting party is given notice that a solution has been identified. Notice of the status attribute change may be provided automatically, such as through an automated email, or requesting entities may be required to manually research whether the status attribute has changed. At step 430, any associated processing comments may be received by the business object 145. These comments may represent information primarily for a manufacturer's internal use. The content may be strongly related to the entire value chain that is to provide the business entity. As such, the information may be hidden from the requesting entity, allowing only the solution provider and others authorized by the solution provider to view the comments.

At step 435, the requesting entity may review one or more of the identified solutions to determine whether or not an acceptable solution has been provided. The requesting entity may decide whether a solution is acceptable through a comparison to the requirements identified in step 410, a cost-benefit analysis of the proposed solution, or other methods of evaluation. If the solution is approved, the method 400 proceeds to step 440 where the status attribute of the accepted solution may be set to a value reflecting the acceptance such as "approved" or "released." Once the status attribute has been modified, method 400 proceeds to step 445 where the business object 145 and the approved solution may be exposed to the requesting party, the solution provider, and other parties as deemed necessary, such as a contractor performing the actual manufacturing or creation of the business entity. Once the accepted solution is exposed, illustrated method 400 can be considered complete.

If, at step 435, the identified solutions are not approved, then method 400 may proceed to step 450. At step 450, system 100 decides whether there has been a change in the requirements since the non-approved solutions were identified. If the requirements have remained constant, then method 400 continues to step 455 wherein the status attribute of the identified solutions are set to "rejected" or a similar value, indicating that the solutions have been reviewed but were not deemed acceptable by the requesting party. Once the attribute has been set, the method 400 returns to step 420, and new proposed solutions to the identified requirements may be identified. From there, method 400 continues on through the process. If the requirements have changed (or some other similar issue arises) as shown as decisional step 450, the status attribute of the proposed solutions may be set to "made obsolete" or a similar value. The proposed solutions may no longer be a solution for the business entity, such that method 400 returns to step 410 to re-identify the requirements. Once the new requirements are identified, method 400 proceeds as initially created until an identified solution is approved and the agreed upon solution is released to the parties.

Figure 5:
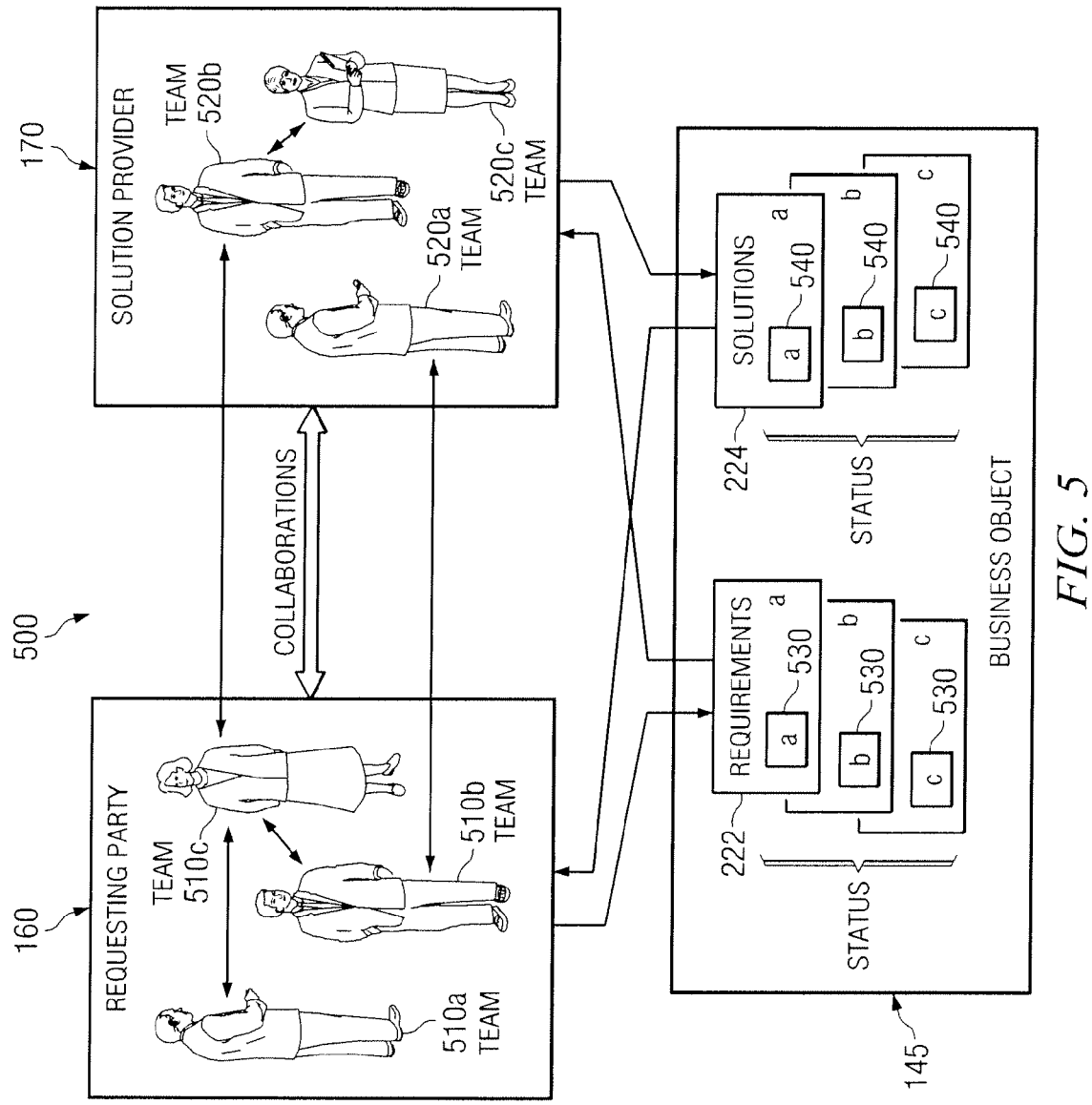
FIG. 5 is a diagram illustrating an example system employing a logically centralized source for collaboration on objectives.

FIG. 5 is a diagram illustrating an example system 500 employing a logically centralized source for collaboration on objectives utilizing statuses. In the illustrated embodiment, statuses are used to communicate information about requirements and solutions, enabling requesting parties and solution providers to work together more efficiently. At a high level, requesting party 160 generates requirements 222 for inclusion in business object 145 and solution provider 170 generates solutions 224 for inclusion in business object 145. Although requirements 222 and solutions 224 are represented in this example as individual requirements and solutions, individual requirements and solutions may be grouped together within business object 145, and multiple groupings and subgroupings may occur within business object 145.

Requesting party 160 may include one or more teams 510 that collaborate on generating requirements. Solution provider 170 may include one or more teams 520 that collaborate on generating solutions. When appropriate, teams 510 of requesting party 160 are geographically remote from teams 520 of solution provider 170. In some implementations, team 510a is geographically remote from teams 510b and 510c, and team 520b is geographically remote from teams 520a and 520c. Business object 145 provides a logically centralized source for collaboration among requesting party 160 and solution provider 170, as well as among teams 510 and 520. Although the example shows a single requesting party 160 and a single solution provider 170, multiple requesting parties and multiple solution providers are supported by system 500, as well as third parties not shown, such as auditing parties.

The accessibility of business object 145 to multiple parties and teams associated with a common business endeavor facilitates the ready dissemination of current information among the parties and teams. Requesting parties 160 and solution providers 170 may provide and obtain information on requirements 222 through the use of status elements 530. Requesting parties 160 and solution providers 170 may provide and obtain information on solutions 224 through the use of status elements 540. Status elements generally indicate the condition of the requirement or solution associated with the status element. For example, a requirement status of In Process may indicate that at least one component of a requirement is still under development by a requesting party, and therefore the requirement is not yet ready for a solution provider to begin developing a solution for that requirement. A solution status of Finished may indicate that all components of a solution are complete, and therefore the solution is ready for evaluation by a requesting party. Although the example system 500 shows a status element present in each requirement and solution, in some implementations, requirements and solutions, or grouping of requirements and solutions, share an aggregate status with other requirements and/or solutions. In some cases, the association of a status element with a particular requirement or solution indicates that the particular requirement or solution is of high importance.

In some implementations, requesting party 160 identifies requirement 222a and indicates, through status element 530a, that requirement 222a is still under development. Because solution provider 170 is able to monitor status element 530a, solution provider 170 may wait for status element 530a to indicate that requirement 222a is finalized before proceeding with development of a solution. In this case, solution provider 170 may proceed with development of a solution to another requirement whose status indicates that it is finalized. In some implementations, mutually dependent requirements are grouped together under a single status, with some dependent requirements having individual status elements while other dependent requirements are aggregated under the group status.

When status element 530a indicates that requirement 222a is finalized, solution provider 170 may identify solution 224a, and indicate, through status element 540a, that solution 224a is still under development. Alternatively, solution provider 170 may determine that additional information is needed before solution development can begin. In this case, solution provider 170 may collaborate with requesting party 160, for example, by requesting clarification of an aspect of requirement 222a. In some cases, this collaboration results in an update to status element 530a to reflect that requirement 222a has returned to development.

Figure 6:
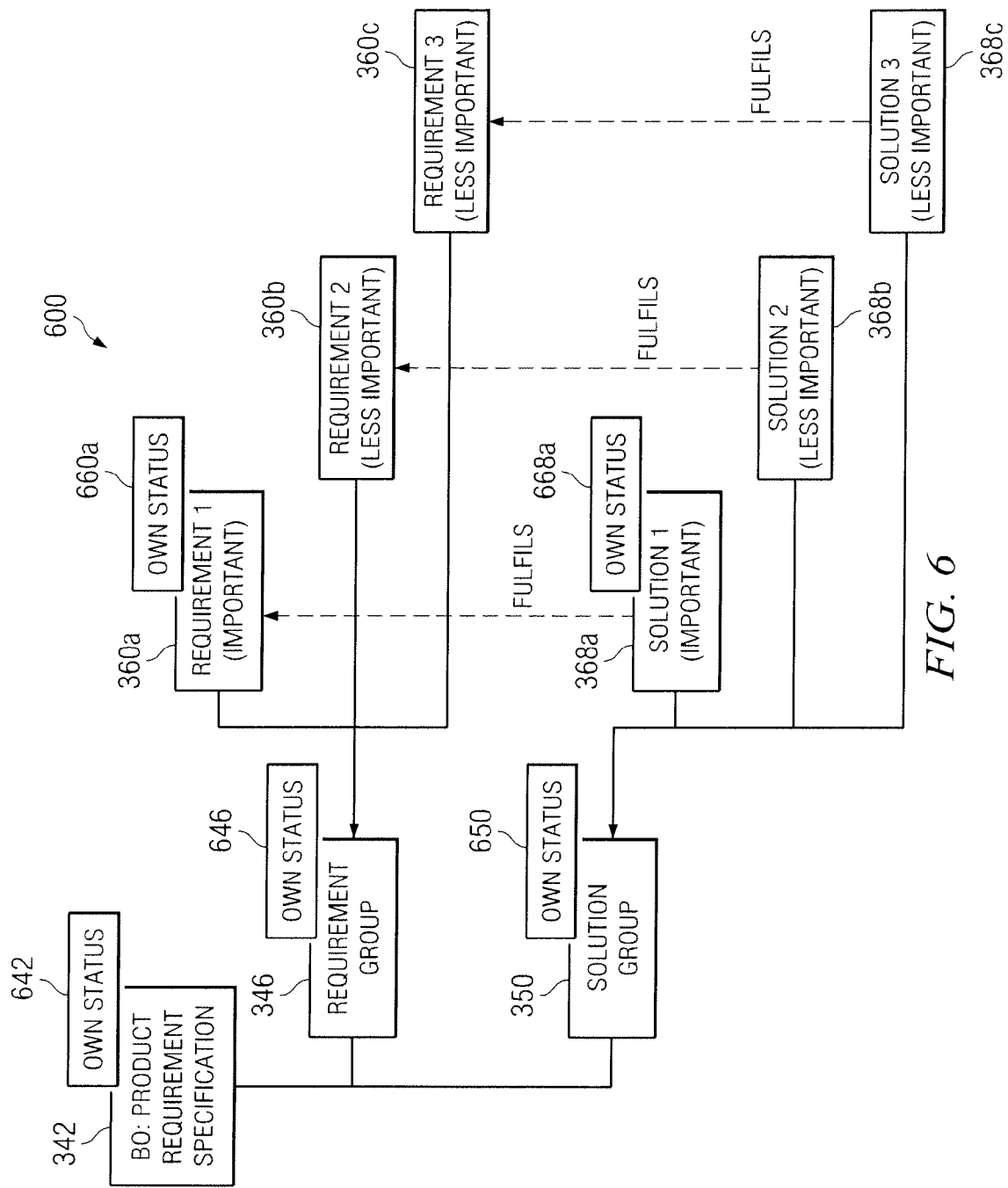
FIG. 6 is a diagram illustrating an example hierarchical representation of a portion of a business object providing a logically centralized source for collaboration on objectives, focusing on status elements.

FIG. 6 is a diagram illustrating an example hierarchical representation of a portion of a business object providing a logically centralized source for collaboration on objectives, focusing on status elements. In this example, business object 342 is named ProductRequirementSpecification and contains information relating to requirements 222 and solutions 224. Business object instance 342 is associated with status element 642 and contains at least subordinates requirement group 346 and solution group 350. In some implementations, the term "solution group" generally refers to the same concept as "specification folder," the term "requirement group" generally refers to the same concept as "requirement folder," and the term "solution" generally refers to the same concept as "specification." Although only one requirement group 346 and one solution group 350 are illustrated, it will be understood that multiple requirement groups and/or solution groups may be implemented. This example illustrates only a portion of business object 342 as shown in FIGS. 3B-1-3B3.

Requirement group 346 is associated with status element 646 and contains at least requirements 360. In this example, requirement 360a is associated with status element 660a, while requirement 360b and requirement 360c are not associated with their own status elements, indicating that any status associated with requirement 360b or 360c is aggregated under status element 646 associated with requirement group 346. In some implementations, more important requirements are associated with their own status elements, while less important requirements are aggregated under a common status.

Solution group 350 is associated with status element 650 and contains at least solutions 368. In this example, solution 368a is associated with status element 668a, while solution 368b and solution 368c are not associated with their own status elements, indicating that any status associated with solution 368b or 368c is aggregated under status element 650 associated with solution group 350. In some implementations, solutions to more important requirements are associated with their own status elements, while solutions to less important requirements are aggregated under a common status.

In some implementations, status elements associated with hierarchically superior nodes are dependent on status elements associated with hierarchically inferior nodes. For example, status element 646 may be required to indicate an incomplete status as long as status element 660a indicates an incomplete status. In this example, status element 646 is also tracking the aggregate status of requirements 360b and 360c, and status element 646 may also be required to indicate an incomplete status as long as either requirement 360b or 360c is incomplete. In other words, in this example, status element 646 may not indicate a complete status until all requirements 360 are complete. Likewise, status element 642 may not indicate a complete status until all subordinate processes, in this case indicated by status 646 and status 650, are complete.

FIGS. 7A through 7F illustrate example status schemas for nodes associated with the business object model. These schemas allow for scalability of the business object, and simpler processes with limited status control and more complex processes with full status control may be used.

Figure 7A:
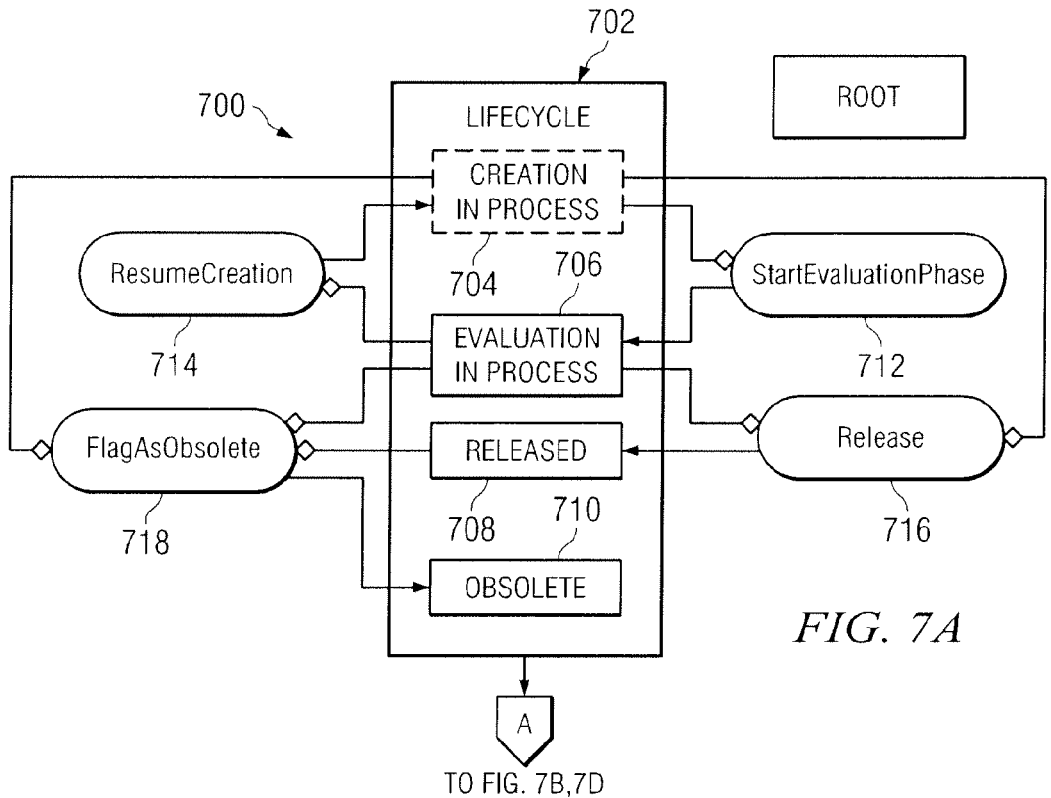
FIG. 7A illustrates an example status schema of business object root node RequirementSpecification.

More specifically, FIG. 7A illustrates an example status schema 700 of business object root node RequirementSpecification 342. In this example, status variable Lifecycle 702 describes the current state of the corresponding root node RequirementSpecification 342. Status Lifecycle 702 indicates whether the RequirementSpecification 342 has been completed in all relevant details of requirements and their assigned specifications. Additionally, status Lifecycle 702 represents the validity of the RequirementSpecification 342 for any consuming process or business object.

Status variable Lifecycle 702 may have the following status values: Creation In Process 704, Evaluation In Process 706, Released 708, and Obsolete 710. Creation In Process 704 indicates that detailed information about requirements, specifications, and assignment relationships between requirements and specifications may be created and maintained, and indicates that RequirementSpecification 342 may be assigned from further business objects to introduce its relevance with corresponding processes. Evaluation In Process 706 indicates that no changes are possible concerning the detailed requirements and their corresponding specifications, and indicates that an evaluation of whether the requirements are fulfilled by the specifications is underway. Released 708 indicates that the included requirements and their specifications are valid and that the specifications represent appropriate solutions to the requirements, indicates that the content of the RequirementSpecification 342 is approved and can now be used in consuming processes or business objects, and indicates that it is not possible to change any content of the RequirementSpecification 342. Obsolete 710 indicates that this RequirementSpecification 342 is no longer needed, for example, due to a technological or legal change that has invalidated major parts of its content, and indicates that the content of the RequirementSpecification 342 cannot be deleted or changed because there may exist processes or business objects with references to this RequirementSpecification 342.

Status Lifecycle 702 may be associated with the following actions: StartEvaluationPhase 712, ResumeCreation 714, Release 716, and FlagAsObsolete 718. In action StartEvaluationPhase 712, the value of status Lifecycle 702 changes from Creation In Process 704 to Evaluation In Process 706. No changes at any subordinate business object node for requirements or specifications are possible in order to evaluate the completeness and fulfillment of the RequirementSpecification 342. If any RequirementFolder 346 has its own status variable CreationProcessing 724, shown in FIG. 7B, this status variable must have value Finished. If any SpecificationFolder 350 has its own status variable CreationProcessing 705, shown in FIG. 7D, this status variable must have value Finished. If any RequirementFolderRequirement 360 has its own status variable CreationProcessing 768, shown in FIG. 7C, this status variable must have value Finished.

In action ResumeCreation 714, the value of status Lifecycle 702 changes from Evaluation In Process 706 to Creation In Process 704. Changes within the business object are possible to complete missing information concerning requirements, specifications, or the fulfillment of requirements.

In action Release 716, the value of status Lifecycle 702 changes from Creation In Process 704 or Evaluation In Process 706 to Released 708. With the release of the RequirementSpecification 342, the maintenance of the business object is complete regarding the requirements, specifications, and the fulfillment of the requirements. If any RequirementFolderRequirement 360 has a status variable SolutionProposal 778, shown in FIG. 7C, this status variable must have value Solution Accepted.

In action FlagAsObsolete 718, the value of status Lifecycle 702 changes from any value to Obsolete 710. After this action, the RequirementSpecification 342 can no longer be changed or used by objects or processes.

Figure 7F:
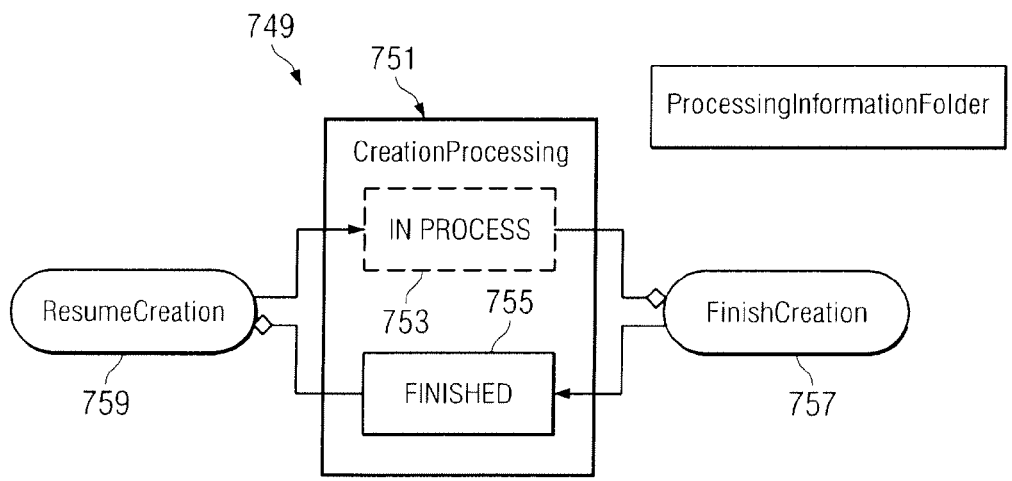
FIG. 7F illustrates an example status schema of business object node ProcessingInformationFolder.
Figure 7B:
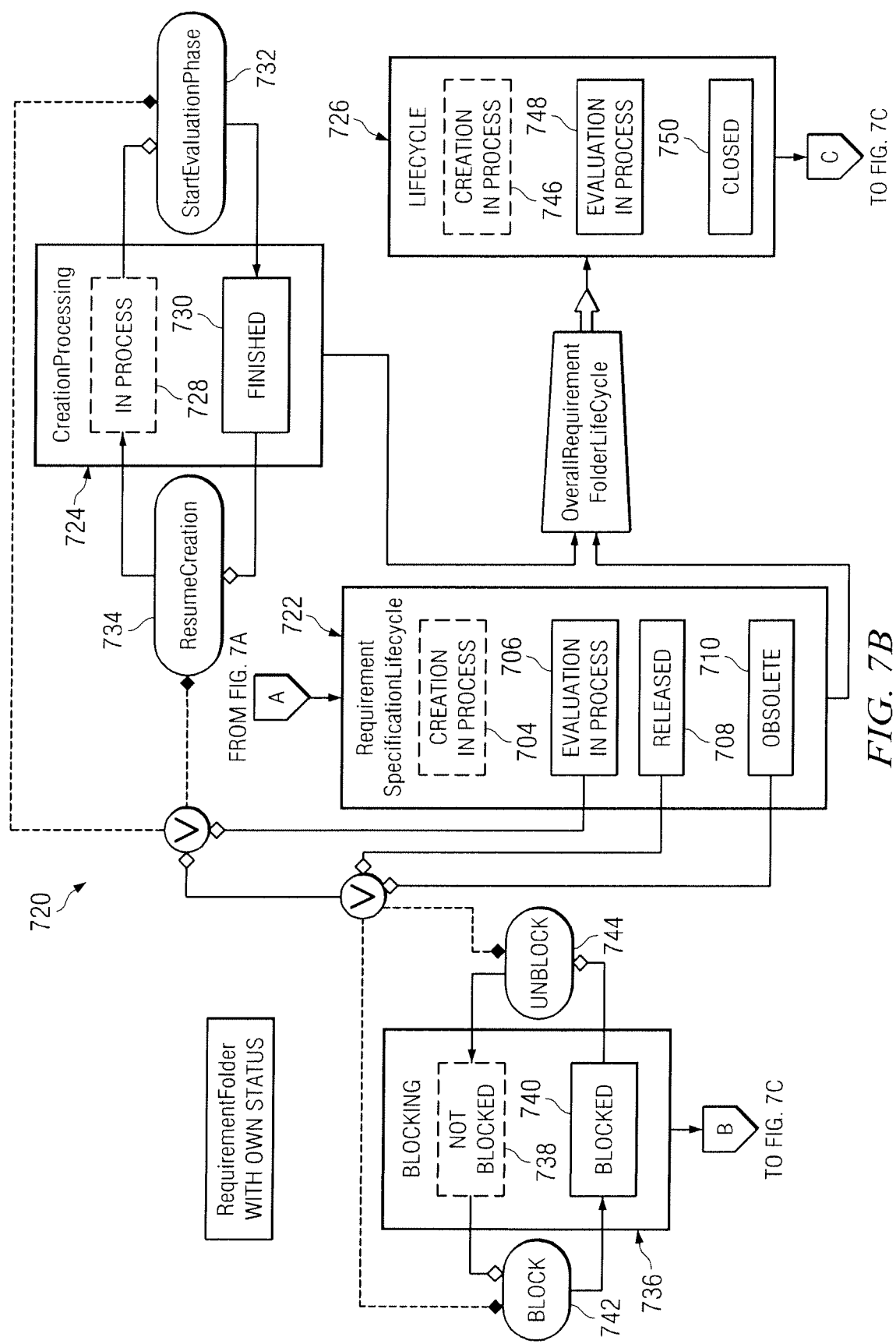
FIG. 7B illustrates an example status schema of business object node RequirementFolder.

FIG. 7B illustrates an example status schema 720 of business object node RequirementFolder 346 with its own processing status. In this example, the status Lifecycle 702 of the root node RequirementSpecification 342 is populated to the corresponding business object node RequirementFolder 346 and titled RequirementSpecificationLifecycle. The value names and definition for status RequirementSpecificationLifecycle 722 are the same as those for status Lifecycle 702.

An individual status variable CreationProcessing 724 at the RequirementFolder node 346 makes possible the control of all subordinate requirements. Status CreationProcessing 724 of the RequirementFolder 346 represents the aggregate status of any subordinate RequirementFolderRequirement 360 not associated with its own status elements. Status CreationProcessing 724 may have the following status values: In Process 728 and Finished 730. In Process 728 indicates that detailed information about subordinate requirements and their fulfillment can be created and maintained. Finished 730 indicates that the definition of all subordinate requirements is complete, and that no subordinate requirement can be created, modified, or deleted.

Status CreationProcessing 724 may be associated with the following actions: StartEvaluationPhase 732 and ResumeCreation 734. These actions are possible when the status RequirementSpecificationLifecycle 722 has value Creation In Process 704. In action StartEvaluationPhase 732, the value of status CreationProcessing 724 changes from In Process 728 to Finished 730. The definition of all subordinate requirements and their content is complete. It is not possible to create, change, or delete subordinate requirements. If any subordinate RequirementFolderRequirement 360 has its own status variable CreationProcessing 768, shown in FIG. 7C, this status variable must have value Finished.

In action ResumeCreation 734, the value of status CreationProcessing 724 changes from Finished 730 to In Process 728. It is possible to add, modify, or delete subordinate requirements if necessary, for example to add missing information or to provide further detail.

Status variable Blocking 736 provides the ability to prevent changes to subordinate RequirementFolderRequirement nodes 360, such as when, for example, a detailed analysis of the subordinate requirements is necessary. Status Blocking 736 may have value Not Blocked 738 to indicate that no blocking of changes is in effect, or status Blocking 736 may have value Blocked 740 to indicate that no changes to subordinate requirements are possible.

Status Blocking 736 may be associated with action Block 742 and action Unblock 744. In some implementations, actions associated with status Blocking 736 are only possible if the status RequirementSpecificationLifecycle 722 has value Creation In Process or Evaluation in Process. In action Block 742, the value of status Blocking 736 changes from Not Blocked 738 to Blocked 740. In action Unblock 744, the value of status Blocking 736 changes from Blocked 740 to Not Blocked 738.

Status Lifecycle 726 shows the life cycle of the RequirementFolder 346 and indicates what can be done in this node. Status Lifecycle 726 may have the following status values: Creation In Process 746, Evaluation In Process 748, and Closed 750. Creation In Process 746 indicates that detailed information about subordinate requirements and their fulfillment may be created and maintained. Evaluation In Process 748 indicates that the definition of all subordinate requirements is complete and indicates that no subordinate requirement can be created, deleted, or changed. Closed 750 indicates that no change to RequirementFolder 346 or subordinate nodes is possible.

The status Lifecycle 726 may be determined as follows. If the status RequirementSpecificationLifecycle 722 has value Released 708 or Obsolete 710, then status Lifecycle 726 will have value Closed 750. If the status RequirementSpecificationLifecycle 722 does not have value Released 708 or Obsolete 710, then status Lifecycle 726 will depend on status CreationProcessing 724. If no status CreationProcessing 724 exists in this instance, then status Lifecycle 726 will have the same value as status RequirementSpecificationLifecycle 722, i.e., Creation In Process or Evaluation In Process. If a status CreationProcessing 724 does exist in this instance, then if the status CreationProcessing 724 has value In Process 728, then status Lifecycle 726 will have value Creation In Process 724, and if the status CreationProcessing 724 has value Finished 730, then status Lifecycle 726 will have value Evaluation In Process 748.

Figure 7C:
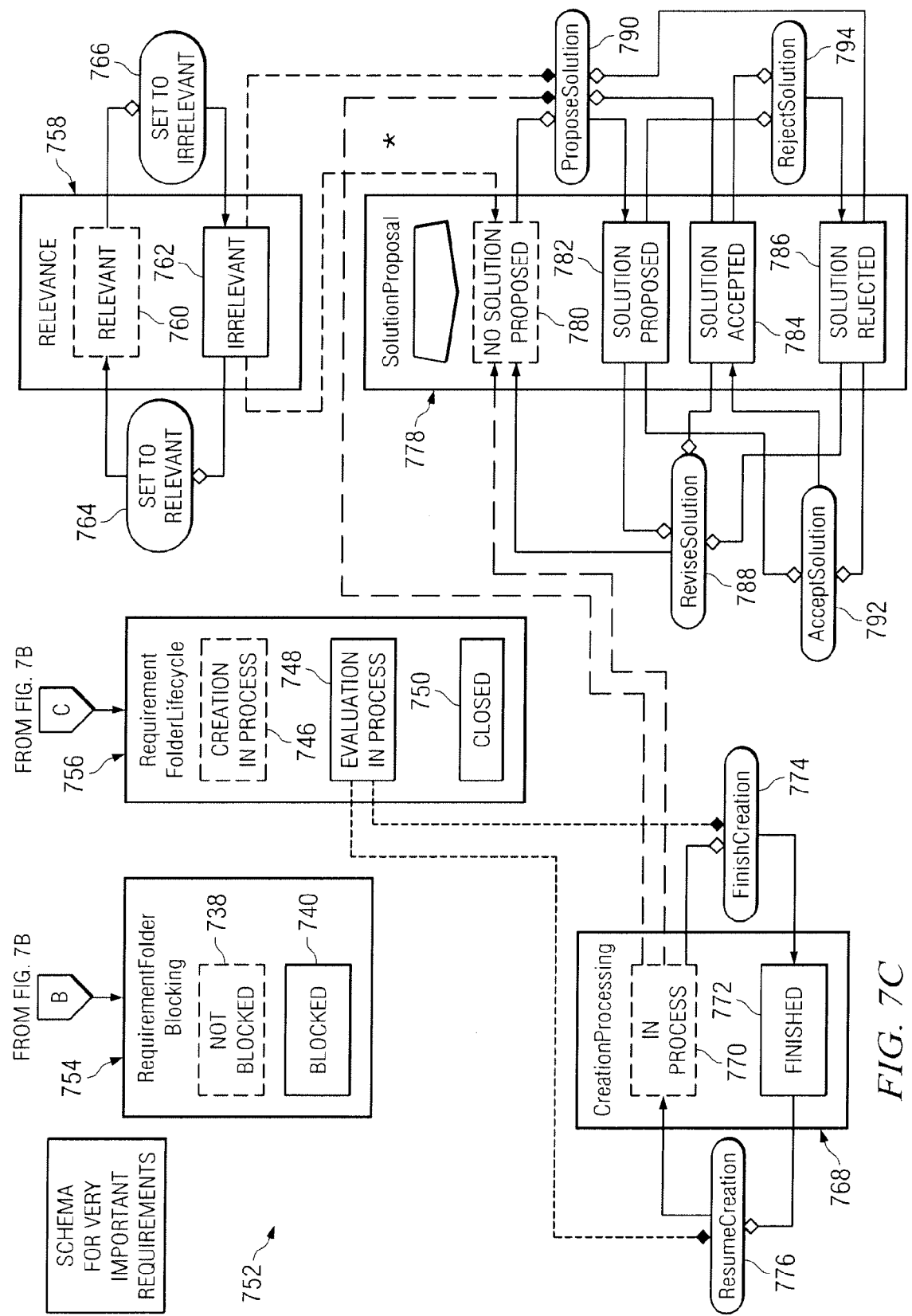
FIG. 7C illustrates an example status schema of business object node Requirement.

FIG. 7C illustrates an example status schema 752 of business object node RequirementFolderRequirement 360 with its own status handling. In this example, the status Blocking 736 of the node RequirementFolder 346 is populated to the corresponding business object node RequirementFolderRequirement 360 and titled RequirementFolderBlocking. The value names and definition for status RequirementFolderBlocking 754 are the same as those for status Blocking 736. Also in this example, the status Lifecycle 726 of the business object node RequirementFolder 346 is populated to the corresponding business object node RequirementFolderRequirement 360 and titled RequirementFolderLifecycle. The value names and definition for status RequirementFolderLifecycle 756 are the same as those for status Lifecycle 726.

Status variable CreationProcessing 768 may have value In Process 770 to indicate that the requirement can be modified if necessary, for example, to describe the content more precisely, or status CreationProcessing 768 may have value Finished 772 to indicate that the requirement is complete. Status CreationProcessing 768 may be associated with action FinishCreation 774 and action ResumeCreation 776. In some implementations, actions associated with status CreationProcessing 768 are only possible if the status RequirementFolderLifecycle 756 has value Creation In Process 746 and if the RequirementFolderBlocking 754 has value Not Blocked 738. In action FinishCreation 774, the value of status CreationProcessing 768 changes from In Process 770 to Finished 772, and it will no longer be possible to change the TextCollection 376 or AttachmentFolder 378. In action ResumeCreation 776, the value of status CreationProcessing 768 changes from Finished 772 to In Process 770, any existing Solution Proposal status variable 778 is set to No Solution Proposed 780, and it is possible to change the requirement.

Status variable Relevance 758 may have value Relevant 760 to indicate that the requirement should be considered in evaluation of fulfillment of the requirement specification, or status Relevance 758 may have value Irrelevant 762 to indicate that the requirement is no longer used in any business context, and is therefore obsolete. Status Relevance 758 may be associated with action Set to Relevant 764 and action Set to Irrelevant 766. In some implementations, actions associated with Relevance 758 are only possible if the status RequirementFolderLifecycle 756 has value Creation In Process 746 or Evaluation In Process 748 and if the RequirementFolderBlocking status 754 has value Not Blocked 738. In action Set to Relevant 764, the value of status Relevance 758 changes from Irrelevant 762 to Relevant 760, and in action Set to Irrelevant 766, the value of status Relevance 758 changes from Relevant 760 to Irrelevant 762. The value of status Relevance 758 impacts the actions associated with status Solution Proposal 778.

Status variable SolutionProposal 778 may have the following status values: No Solution Proposed 780, Solution Proposed 782, Solution Accepted 784, and Solution Rejected 786. No Solution Proposed 780 indicates that no evaluation of whether the requirement is met is underway. Solution Proposed 782 indicates that the evaluation of whether the requirement is met is underway. Solution Accepted 784 indicates that the requirement is met by the assigned specifications. Solution Rejected 786 indicates that the requirement is not met by the assigned specifications.

Status SolutionProposal 778 may be associated with the following actions: ReviseSolution 788, ProposeSolution 790, AcceptSolution 792, and RejectSolution 794. In some implementations, these actions are possible only if the status CreationProcessing 768 has value Finished 772, the status RequirementFolderLifecycle 756 has the value Creation In Process 746 or Evaluation In Process 748, and the RequirementFolderBlocking 754 has value Not Blocked 738. Status SolutionProposal 778 is reset to value No Solution Proposed 780 and its associated actions are deactivated if status Relevance 758 changes from Relevant 760 to Irrelevant 762.

In action ReviseSolution 788, the value of status SolutionProposal 778 changes from any value to No Solution Proposed 780, and changes are possible to the specification assignments. In action ProposeSolution 790, the value of status SolutionProposal 778 changes from any value to SolutionProposed 782, and neither content nor assignments may be changed to allow an evaluation of whether the requirement is met. In action AcceptSolution 792, the value of status SolutionProposal 778 changes from Solution Proposed 782 or Solution Rejected 786 to SolutionAccepted 784, and indicates that the requirement is met. In action RejectSolution 794, the value of status SolutionProposal 778 changes from Solution Proposed 782 or Solution Accepted 784 to Solution Rejected 786, and indicates that the requirement is not met.

In some implementations, the status SolutionProposal 778 will be reset to No Solution Proposed 780 should any of the following occur: (1) status CreationProcessing 768 for the requirement is changed from Finished 772 to In Process 770; (2) status CreationProcessing 739 for an assigned specification, discussed in FIG. 7E, is changed from Finished 743 to In Process 741; (3) a new specification is assigned to the requirement; or (4) a specification assignment for the requirement is deleted.

Figure 7D:
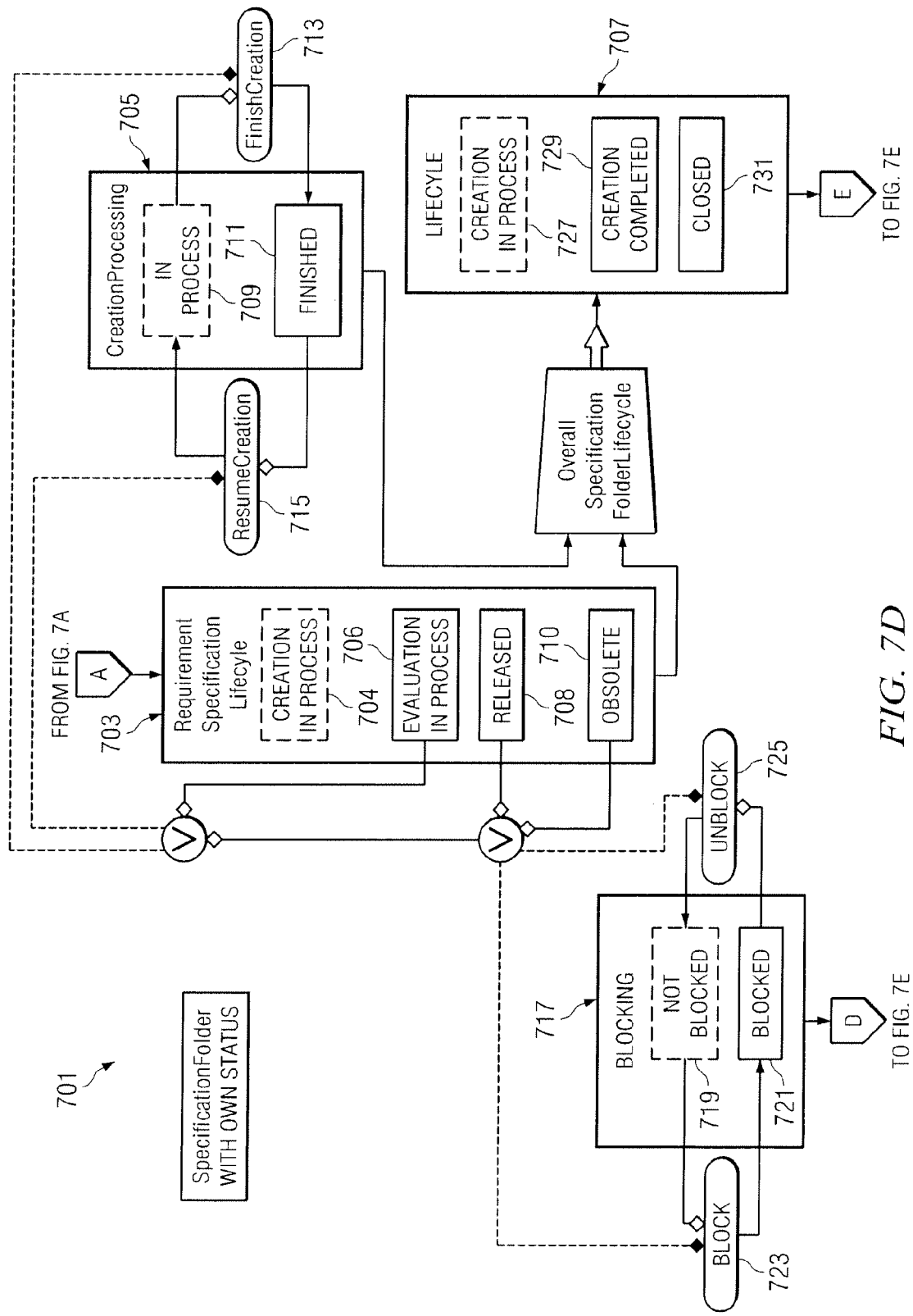
FIG. 7D illustrates an example status schema of business object node SpecificationFolder.
Figure 7E:
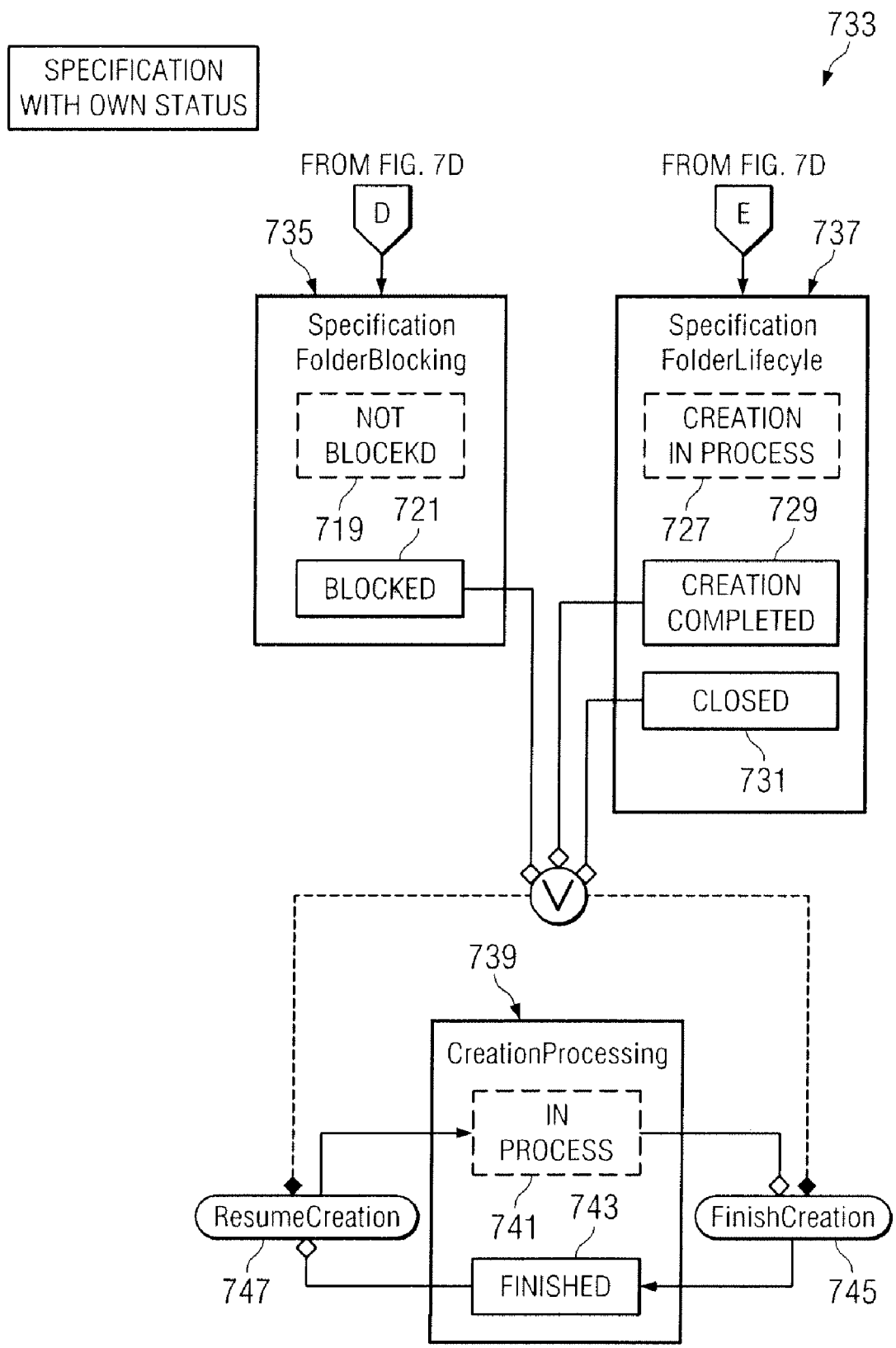
FIG. 7E illustrates an example status schema of business object node Specification.

FIG. 7D illustrates an example status schema 701 of business object node SpecificationFolder 350 with its own processing status. In this example, the status Lifecycle 702 of the root node RequirementSpecification 342 is populated to the corresponding business object node SpecificationFolder 350 and titled RequirementSpecificationLifecycle 703. The value names and definition for status RequirementSpecificationLifecycle 703 are the same as those for status Lifecycle 702.

An individual status variable CreationProcessing 705 at the SpecificationFolder node 350 makes possible the control of all subordinate specifications. It is possible to block changes to the content of subordinate specifications once the evaluation of whether the requirements are met is underway. Status CreationProcessing 705 of the SpecificationFolder 350 represents the aggregate status of any subordinate SpecificationFolderSpecification 368 not associated with its own status elements. Status CreationProcessing 705 may have the following status values: In Process 709 and Finished 711. In Process 709 indicates that detailed information about subordinate specifications can be created, maintained, and assigned to requirements if necessary. Finished 711 indicates that the definition of all subordinate specifications is complete.

Status CreationProcessing 705 may be associated with the following actions: FinishCreation 713, and ResumeCreation 715. These actions may be possible when the status RequirementSpecificationLifecycle 703 has value Creation In Process 704. In action FinishCreation 713, the value of status CreationProcessing 705 changes from In Process 709 to Finished 711. The definition of all subordinate specifications and their content is complete. It is not possible to create, change, or delete subordinate specifications. If any subordinate SpecificationFolderSpecification 368 has its own status variable CreationProcessing 739, shown in FIG. 7E, this status variable must have value Finished.

In action ResumeCreation 715, the value of status CreationProcessing 705 changes from Finished 711 to In Process 709. It is possible to add, modify, or delete subordinate specifications if necessary, for example to add missing information or provide further detail.

Status variable Blocking 717 provides the ability to prevent changes to subordinate specification nodes, such as when, for example, a detailed analysis of the subordinate specifications is necessary. Status Blocking 717 may have value Not Blocked 719 to indicate that no blocking of changes is in effect, or status Blocking 717 may have value Blocked 721 to indicate that no changes to subordinate specifications are possible.

Status Blocking 717 may be associated with action Block 723 and action Unblock 725. In some implementations, actions associated with Blocking 717 are only possible if the status RequirementSpecificationLifecycle 703 has value Creation In Process 704 or Evaluation In Process 706. In action Block 723, the value of status Blocking 717 changes from Not Blocked 719 to Blocked 721. In action Unblock 725, the value of status Blocking 717 changes from Blocked 721 to Not Blocked 719.

Status variable Lifecycle 707 shows the life cycle of the SpecificationFolder 350, and indicates what can be done in this node. Status Lifecycle 707 may have the following status values: Creation In Process 727, Creation Completed 729, and Closed 731. Creation In Process 727 indicates that detailed information about subordinate specifications may be created and maintained. Creation Completed 729 indicates that the definition of all subordinate specifications is complete and indicates that no subordinate specification can be created, deleted, or changed. Closed 731 indicates that no change of SpecificationFolder 350 or subordinate nodes is possible.

The status Lifecycle 707 may be determined as follows. If the status RequirementSpecificationLifecycle 703 has value Released 708 or Obsolete 710, then status Lifecycle 707 will have value Closed 731. If the status RequirementSpecificationLifecycle 703 does not have value Released 708 or Obsolete 710, then status Lifecycle 707 will depend on the status CreationProcessing 705. If no status CreationProcessing 705 exists in this instance, then if status RequirementSpecificationLifecycle 703 has value Creation In Process 704, then status Lifecycle 707 will have value Creation In Process 727, and if status RequirementSpecificationLifecycle 703 has value Evaluation In Process 706, then status Lifecycle 707 will have value Creation Completed 729. If a status CreationProcessing 705 does exist in this instance, then if the status CreationProcessing 705 has value In Process 709, then status Lifecycle 707 will have value Creation In Process 727, and if the status CreationProcessing 705 has value Finished 711, then status Lifecycle 707 will have value Creation Completed 729.

FIG. 7E illustrates an example status schema 733 of business object node SpecificationFolderSpecification 368 with its own status handling. In this example, the status Blocking 717 of the node SpecificationFolder 350 is populated to the corresponding business object node SpecificationFolderSpecification 368 and titled SpecificationFolderBlocking. The value names and definition for status SpecificationFolderBlocking 735 are the same as those for status Blocking 717. Also in this example, the status Lifecycle 707 of the business object node SpecificationFolder 350 is populated to the corresponding business object node SpecificationFolderSpecification 368 and titled SpecificationFolderLifecycle. The value names and definition for status SpecificationFolderLifecycle 737 are the same as those for status Lifecycle 707.

Status variable CreationProcessing 739 may have value In Process 741 to indicate that the specification can be modified if necessary, for example, to describe the content more precisely, or status CreationProcessing 739 may have value Finished 743 to indicate that the specification is complete. Status CreationProcessing 739 may be associated with action FinishCreation 745 and action ResumeCreation 747. In some implementations, actions associated with status CreationProcessing 739 are only possible if the status SpecificationFolderLifecycle 737 has value Creation In Process 727 and if the SpecificationFolderBlocking 735 has value Not Blocked 719. In action FinishCreation 745, the value of status CreationProcessing 739 changes from In Process 741 to Finished 743, and it is no longer possible to change the TextCollection 384 or AttachmentFolder 386. In action ResumeCreation 747, the value of status CreationProcessing 739 changes from Finished 743 to In Process 741, it is possible to change the specification, and the Solution Proposal status variable 778 of all assigned requirements will be set to the initial value.

FIG. 7F illustrates an example status schema 749 of business object node ProcessingInformationFolder 352. Status variable CreationProcessing 751 may have value In Process 753 to indicate that information describing process relevant topics can be added, modified, or deleted, or status CreationProcessing 751 may have value Finished 755 to indicate that information concerning the process usage is complete and can no longer be changed. Status CreationProcessing 751 may be associated with action FinishCreation 757 and action ResumeCreation 759. Actions associated with status CreationProcessing 751 are not coupled to the life cycle of the root node 342, and it is possible to perform actions on the ProcessingInformationFolder 352 in order to control the detailed content whenever necessary. In action FinishCreation 757, the value of status CreationProcessing 751 changes from In Process 753 to Finished 755, and it is no longer possible to add, modify, or delete process information. In action ResumeCreation 759, the value of status CreationProcessing 751 changes from Finished 755 to In Process 753, and it is possible to add, modify, or delete process information, for example, to assist with in-house processing aspects.

Figure 8A:
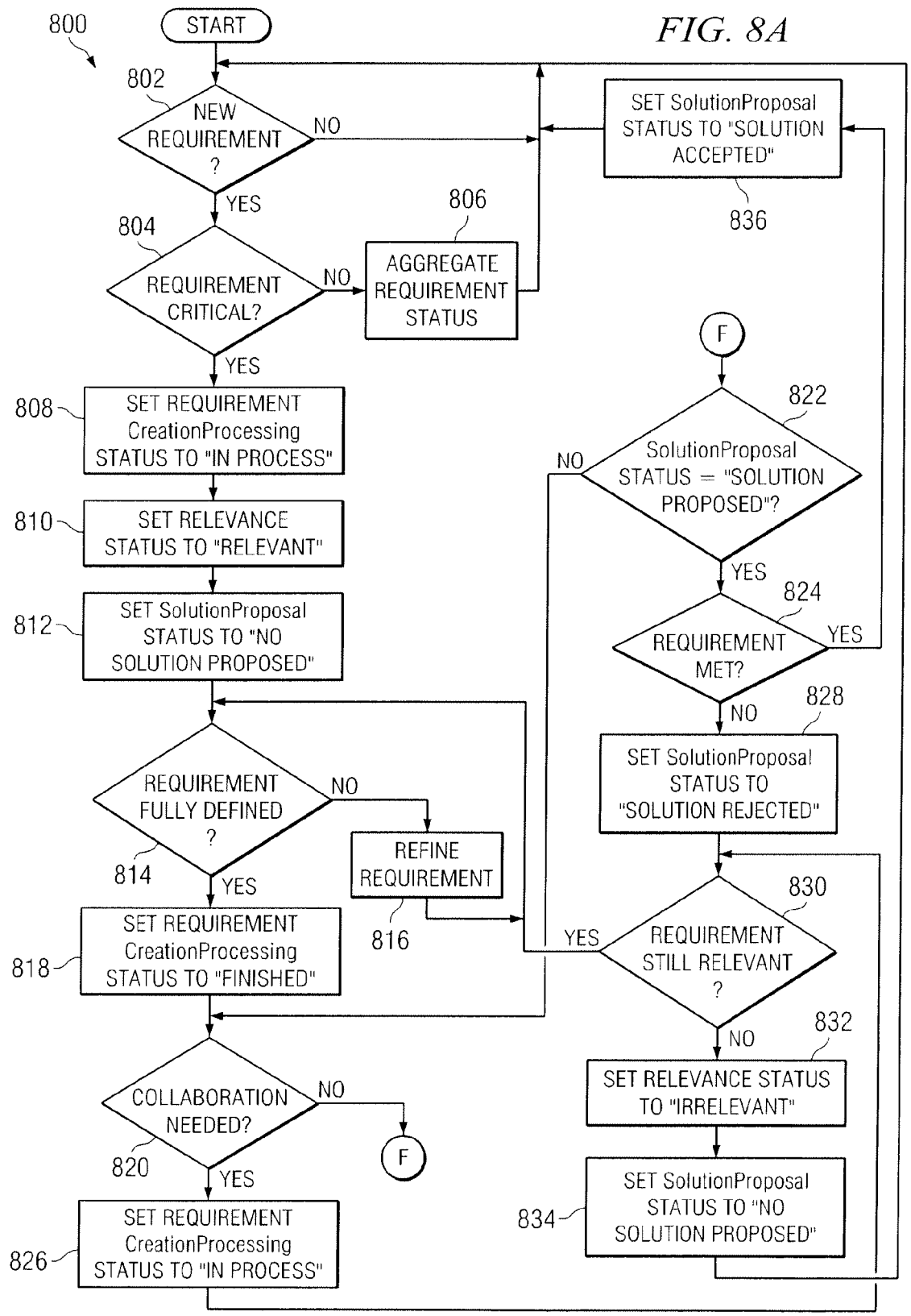
FIG. 8A is a flowchart illustrating an example method for using a logically centralized source for collaboration on objectives from the perspective of a requesting party.

FIG. 8A is a flowchart illustrating an example method 800 for using a logically centralized source, such as business object 302, for collaboration on objectives from the perspective of a requesting party 160. At step 802, the method 800 is launched when a new requirement is received, selected, determined, or otherwise identified. The new requirement may be initially identified by the requesting party 160, by an entity associated with the requesting party 160 such as a customer, by a solution provider 170, by an entity associated with the solution provider 170 such as a vendor, or by another entity associated in some way with the business process. After the new requirement is identified, the requesting party 160 determines at step 804 whether the new requirement warrants its own status. For example, this determination may be based on the criticality of the requirement, the relevant timing of the requirement, the priority of the requirement, the parties involved, the public nature of the requirement, and so forth. If this is not the case, then the requesting party 160 aggregates the status of the new requirement with the status of other requirements at step 806, and method 800 is complete for this requirement. If the new requirement will utilize a status, then the requesting party 160 assigns the new requirement its own status. The requirement status may be assigned in accordance with a status schema. In example method 800, the requirement status is assigned in accordance with status schema 752 shown in FIG. 7C.

Various status variables associated with the requirement are initialized at steps 808, 810, and 812. At step 808, the CreationProcessing status for the requirement is set to value "In Process," indicating to any entities associated with the business process that the requirement is still under development. At step 810, the Relevance status for the requirement is set to value "Relevant," indicating to any entities associated with the business process that the requirement is currently relevant. At step 812, the SolutionProposal status is set to "No Solution Proposed," indicating to any entities associated with the business process that a solution has not yet been developed for the requirement.

At step 814, the requesting party 160 determines whether the requirement is fully defined. If the requirement is not fully defined, the requesting party 160, at step 816, continues to refine the requirement. If the requirement is fully defined, the requesting party 160, at step 818, sets the CreationProcessing status for the requirement to value "Finished," indicating that the requirement is finalized and ready for a solution provider 170 to proceed with development of a solution to the requirement.

The requesting party 160 takes no further action with regard to this requirement until either collaboration is needed or a solution is proposed. At step 820, the requesting party 160 determines whether collaboration is needed. Collaboration may be needed, for example, if new information concerning the requirement is presented to the requesting party 160 which requires reexamination of the requirement. This new information may come from within the requesting party 160 or from an external source. In one example, a solution provider 170 may inspect the requirement and determine that more information is needed before proceeding with development of a solution. In another example, a shortage of materials may require that the original requirement be modified. If collaboration is needed, the CreationProcessing status for the requirement is set to "In Process" at step 826.

After the collaboration process, the requesting party 160 determines whether the requirement is still relevant to the business process at step 830. The requirement may become irrelevant to the business process, for example, if a customer cancels or changes an order. If the requirement is no longer relevant, the Relevance status is set to "Irrelevant" at step 832, indicating that the requirement is obsolete and development of a solution is no longer needed, the SolutionProposal status is set to "No Solution Proposed" at step 834 and method 800 is complete for this requirement.

If the requirement is still relevant, then the requesting party 160 again determines whether the requirement is fully defined at step 814. For example, during the collaboration process, the solution provider 170 may have discovered a problem with the requirement requiring further refinement of the requirement. In another example, the collaboration process may have revealed that the solution provider 170 misunderstood the requirement and the requirement remains fully defined.

At step 822, the requesting party 160 determines whether the SolutionProposal status is set to value "Solution Proposed," indicating that a solution provider 170 has completed development of a solution to the requirement. If no solution has been proposed, the requesting party 160 repeats steps 820 and 822 until either collaboration is needed or a solution is proposed. If a solution is proposed, the requesting party 160 evaluates at step 824 whether the requirement is fully met in the proposed solution. If the requirement is fully met, then the SolutionProposal status is set to "Solution Accepted" at step 836 and method 800 is complete for this requirement.

If the requesting party 160 determines at step 824 that the requirement is not fully met in the proposed solution, the SolutionProposal status is set to "Solution Rejected" at step 828. The relevance of the requirement is again evaluated at step 830, and if the requirement is still relevant, the method repeats from step 814, and continues until either the requirement is determined to be irrelevant or a solution is accepted, completing method 800 for this requirement.

Figure 8B:
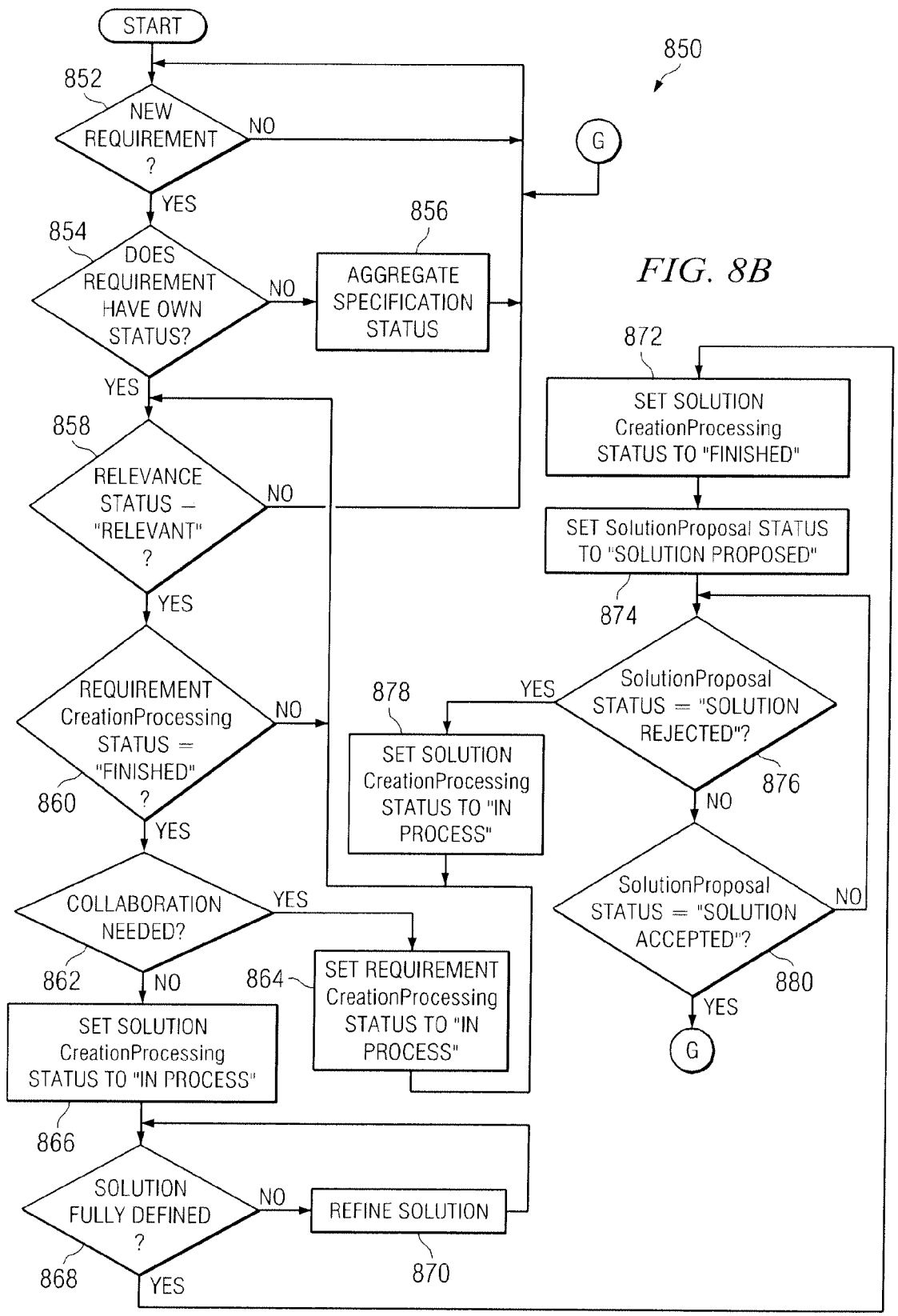
FIG. 8B is a flowchart illustrating an example method for using a logically centralized source for collaboration on objectives from the perspective of a solution provider.

FIG. 8B is a flowchart illustrating an example method 850 for using a logically centralized source, such as a business object, for collaboration on objectives from the perspective of a solution provider 170. At step 852, the method 850 is launched when a new requirement is received, selected, determined, or otherwise identified. The new requirement may be initially identified by a requesting party 160, by an entity associated with the requesting party 160 such as a customer, by a solution provider 170, by an entity associated with a solution provider 170 such as a vendor, or by another entity associated in some way with the business process. After the new requirement is identified, the solution provider 170 determines at step 854 whether the new requirement has been determined to be critical enough to warrant its own status. If the new requirement does not have its own status, then the solution provider 170 aggregates the status of the solution for the new requirement with the status of other solutions to non-critical requirements at step 856, and method 850 is complete for this requirement. If the new requirement does have its own status, the requirement status may have been assigned in accordance with a status schema. In example method 850, the requirement status has been assigned in accordance with status schema 752 shown in FIG. 7C, and the solution status, also referred to as the specification status, will be assigned in accordance with status schema 733 shown in FIG. 7E.

At step 858, the solution provider 170 determines whether the requirement is still relevant, as indicated by the Relevance status. If the requirement is no longer relevant, no solution is required, and method 850 is complete for this requirement. If the requirement is still relevant, the solution provider 170 determines, at step 860, whether the requesting party 160 has completed development of the requirement, as indicated by the CreationProcessing status for the requirement. If the requirement is still under development, the solution provider 170 takes no further action until either the requirement is determined to be irrelevant or the requirement is fully developed.

When the CreationProcessing status for the requirement has value "Finished," indicating that the requirement is fully developed, the solution provider 170 determines whether collaboration is needed at step 862. Collaboration may be needed, for example, if the solution provider 170 has questions about the requirement. If collaboration is needed, the CreationProcessing status for the requirement is set to "In Process" at step 864, and the solution provider 170 takes no further action until either the requirement is determined to be irrelevant or the requirement is fully developed.

After the collaboration process, or if no collaboration is needed, the CreationProcessing status for the solution is set to value "In Process" at step 866, indicating to any entities associated with the business process that the solution is still under development. At step 868, the solution provider 170 determines whether the solution to the requirement is fully defined. If the solution is not fully defined, the solution provider 170, at step 870, continues to refine the solution. If the solution is fully defined, the solution provider 170, at step 872, sets the CreationProcessing status for the solution to value "Finished," indicating that the solution is finalized and ready for the requesting party 160 to evaluate whether the solution is appropriate for the requirement. The SolutionProposal status is then set to value "SolutionProposed" at step 874.

The solution provider 170 takes no further action with regard to the solution to this requirement until the proposed solution is either rejected or accepted. If the proposed solution is rejected, as indicated by the SolutionProposal status in step 876, the CreationProcessing status for the solution is set to value "In Process" at step 878. The method then repeats from step 858, and continues until either the requirement is determined to be irrelevant or a solution is accepted at step 880, completing method 850 for this requirement.

The preceding flowcharts and accompanying descriptions illustrate example methods 400, 800, and 850. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer program product for implementing a logically centralized source for collaboration on objectives comprising instructions stored on a tangible, non-transient computer readable medium, the computer program product operable when executed to:
    identify one or more requirements associated with a business entity for use in a business object stored within a logically centralized repository, the repository storing a plurality of business objects and a first of the identified requirements associated with a first requirement status;
    update a first requirement status associated with a first of the identified requirements to indicate that the first requirement is finalized when all the other identified one or more requirements are finalized;
    identify one or more solutions associated with the identified requirements for use in the business object, a first of the identified solutions associated with a first solution status and the first solution status associated with the first requirement status;
    update a first solution status associated with a first of the identified solutions to indicate that the first solution is finalized when all the other identified one or more solutions are finalized;
    wherein each requirement comprises a node within a hierarchically arranged requirement substructure and each solution comprises a node within a hierarchically arranged solution substructure, wherein the requirement substructure and the solution substructure are identically arranged; and
    notify a party of an update to one of the statuses associated with the identified requirements and solutions.

2. The computer program product of claim 1, the party comprising the business entity.

3. The computer program product of claim 1, the updated status comprising the first solution status.

4. The computer program product of claim 1, a second of the identified requirements associated with a second requirement status.

5. The computer program product of claim 4, the first requirement hierarchically superior to the second requirement and the first requirement status dependent on the second requirement status.

6. The computer program product of claim 5, a second of the identified solutions associated with a second solution status and the second solution status associated with the second requirement status.

7. The computer program product of claim 6, the first solution hierarchically superior to the second solution and the first solution status dependent on the second solution status.

8. The computer program product of claim 7, a third of the identified requirements associated with a third requirement status.

9. The computer program product of claim 8, the first requirement hierarchically superior to the third requirement and the first requirement status dependent on the third requirement status.

10. The computer program product of claim 9, the second requirement hierarchically neutral to the third requirement and the second requirement status independent of the third requirement status.

11. The computer program product of claim 9, the second requirement hierarchically superior to the third requirement and the second requirement status dependent on the third requirement status.

12. The computer program product of claim 9, a third of the identified solutions associated with a third solution status and the third solution status associated with the third requirement status.

13. The computer program product of claim 12, the first solution hierarchically superior to the third solution and the first solution status dependent on the third solution status.

14. The computer program product of claim 13, the second solution hierarchically neutral to the third solution and the second solution status independent of the third solution status.

15. The computer program product of claim 13, the second solution hierarchically superior to the third solution and the second solution status dependent on the third solution status.

16. The computer program product of claim 1, the requirement substructure and the solution substructure forming a project structure, the project structure associated with a project status.

17. The computer program product of claim 16, each node associated with one or more elements wherein the elements are comprised of one or more of the following: documents, drawings, notes, or other suitable data.

18. The computer program product of claim 1, the first requirement status indicating that the first requirement is finalized, the software further operable to:
    receive notification from a solution provider that the first requirement is deficient;
    modify the first requirement status to indicate that the first requirement is under development;
    modify the deficient requirement; and
    update the first requirement status.

19. A system for implementing a logically centralized source for collaboration on objectives comprising:
    memory storing a plurality of business objects; and
    one or more processors operable to:
        identify one or more requirements associated with a business entity for use in one of the plurality of business objects, a first of the identified requirements associated with a first requirement status;
        update a first requirement status associated with a first of the identified requirements to indicate that the first requirement is finalized when all the other identified one or more requirements are finalized;
        identify one or more solutions associated with the identified requirements for use in the business object, a first of the identified solutions associated with a first solution status and the first solution status associated with the first requirement status;
        update a first solution status associated with a first of the identified solutions to indicate that the first solution is finalized when all the other identified one or more solutions are finalized;
        wherein each requirement comprises a node within a hierarchically arranged requirement substructure and each solution comprises a node within a hierarchically arranged solution substructure, wherein the requirement substructure and the solution substructure are identically arranged; and notify a party of an update to one of the statuses associated with the identified requirements and solutions.

20. A system for implementing a logically centralized source for collaboration on objectives comprising:

memory storing a plurality of business objects; and one or more processors operable to:

identify one or more requirements associated with a business entity for use in one of the plurality of business objects;

update a first requirement status associated with a first of the identified requirements to indicate that the first requirement is finalized when all the other identified one or more requirements are finalized;

identify one or more solutions associated with the identified requirements for use in the business object, a first of the identified solutions associated with a first solution status and the first solution status associated with the first requirement status;

update a first solution status associated with a first of the identified solutions to indicate that the first solution is finalized when all the other identified one or more solutions are finalized;

wherein each requirement comprises a node within a hierarchically arranged requirement substructure and each solution comprises a node within a hierarchically arranged solution substructure, wherein the requirement substructure and the solution substructure are identically arranged; and notify a party that the one of the plurality of business objects is finalized when the first of the identified requirement is finalized and the first of the identified solution is finalized.

* * * * *